(12) United States Patent
Lee

(10) Patent No.: US 7,051,085 B1
(45) Date of Patent: May 23, 2006

(54) REMOTE SAVING METHOD OF THE SEARCH INFORMATION ON THE INTERNET

(76) Inventor: Tae Gyu Lee, Sangsin Apt., 10-101, Sadang 4-dong 1000-2, Dongjak-gu, Seoul 156-823 (KR)

( * ) Notice: Subject to any disclaimer, the term of this patent is extended or adjusted under 35 U.S.C. 154(b) by 0 days.

(21) Appl. No.: 09/786,790

(22) PCT Filed: Apr. 19, 2000

(86) PCT No.: PCT/KR00/00364

§ 371 (c)(1),
(2), (4) Date: Apr. 27, 2001

(87) PCT Pub. No.: WO01/09776

PCT Pub. Date: Feb. 8, 2001

(30) Foreign Application Priority Data

| Aug. 2, 1999 | (KR) | 1999-31718 |
| Oct. 12, 1999 | (KR) | 1999-44080 |
| Dec. 29, 1999 | (KR) | 1999-64756 |

(51) Int. Cl.
*G06F 15/16* (2006.01)

(52) U.S. Cl. ............... 709/219; 709/203; 709/217; 709/218

(58) Field of Classification Search ............... 709/206, 709/207, 203, 212–219, 222, 223–224
See application file for complete search history.

(56) References Cited

U.S. PATENT DOCUMENTS

| 6,377,946 B1* | 4/2002 | Okamoto et al. ............... 707/5 |
| 6,438,539 B1* | 8/2002 | Korolev et al. ................ 707/3 |
| 6,580,914 B1* | 6/2003 | Smith ...................... 455/456.6 |
| 6,701,352 B1* | 3/2004 | Gardner et al. ............. 709/218 |
| 6,704,466 B1* | 3/2004 | Yamamoto et al. ......... 382/305 |
| 6,732,086 B1* | 5/2004 | Plow et al. .................... 707/3 |
| 6,732,154 B1* | 5/2004 | Poulton et al. ............. 709/206 |

(Continued)

FOREIGN PATENT DOCUMENTS

| CA | 2229927 | 3/1997 |

(Continued)

OTHER PUBLICATIONS

James D. Solomon, Mobile IP (The Internet Unplugged), 1998, Prentice Hall, 9-20.

(Continued)

*Primary Examiner*—Ario Etienne
*Assistant Examiner*—Hussein El-chanti
(74) *Attorney, Agent, or Firm*—Lawrence G. Kurland; Bryan Cave LLP

(57) ABSTRACT

A method for remotely storing information searched on the Internet. An information searcher accesses a Web server (110) and searches it for desired information. The information searcher requests a remote storage service of the Web server. Then, the information searcher sends to the Web server a URL of the searched information and a URL of a remote-site server (100) into which the searched information is to be stored. The Web server (110) sets up a storage path with the remote-site server (100) under the condition that it is online to the remote-site server and sends a remote storage request message to the server (100). The Web server sends to the remote-site server a Web text to be stored and a URL indicative of a storage location for the Web text in the remote-site server. If the storage path is valid, then the remote-site server stores the Web text.

18 Claims, 18 Drawing Sheets

U.S. PATENT DOCUMENTS

| | | | |
|---|---|---|---|
| 6,789,076 B1 * | 9/2004 | Dutta | 707/5 |
| 6,834,276 B1 * | 12/2004 | Jensen et al. | 707/2 |
| 6,839,705 B1 * | 1/2005 | Grooters | 707/4 |
| 6,857,074 B1 * | 2/2005 | Bobo, II | 713/168 |

FOREIGN PATENT DOCUMENTS

| | | |
|---|---|---|
| CA | 2367330 | 9/2000 |
| EP | 695076 A1 | 1/1996 |

OTHER PUBLICATIONS

Charles E. Perkins, Mobile IP (Design Principles and Practices), 1998, Addison-Wesley, p. 1-5.

W. Richard Steven, TCP/IP Issustrated vols. 2,3, 1994-1996, Addison-Wesley, vol. 2, p. 89-120, p. 171-202, p. 377-385, p. 391-401, vol. 3, p. 9-18.

Douglas E. Comer, Internetworking with TCP/IP vols. I, II, 1991-1993, Prentice Hall, vol. I, p. 33-51, 169-178, 223-260, 419-459, vol. II, p. 161-206.

J. Postel, J. Reynolds, "File Transfer Protocol (FTP)", 1985 RFC 959.

R. Fielding, J. Gettys, J. Mogul, H. Frystyk, T. Berners-Lee, "Hypertext Transfer Protocol—HTTP/1/1" 1997 RFC 2068.

* cited by examiner

[Fig. 1]
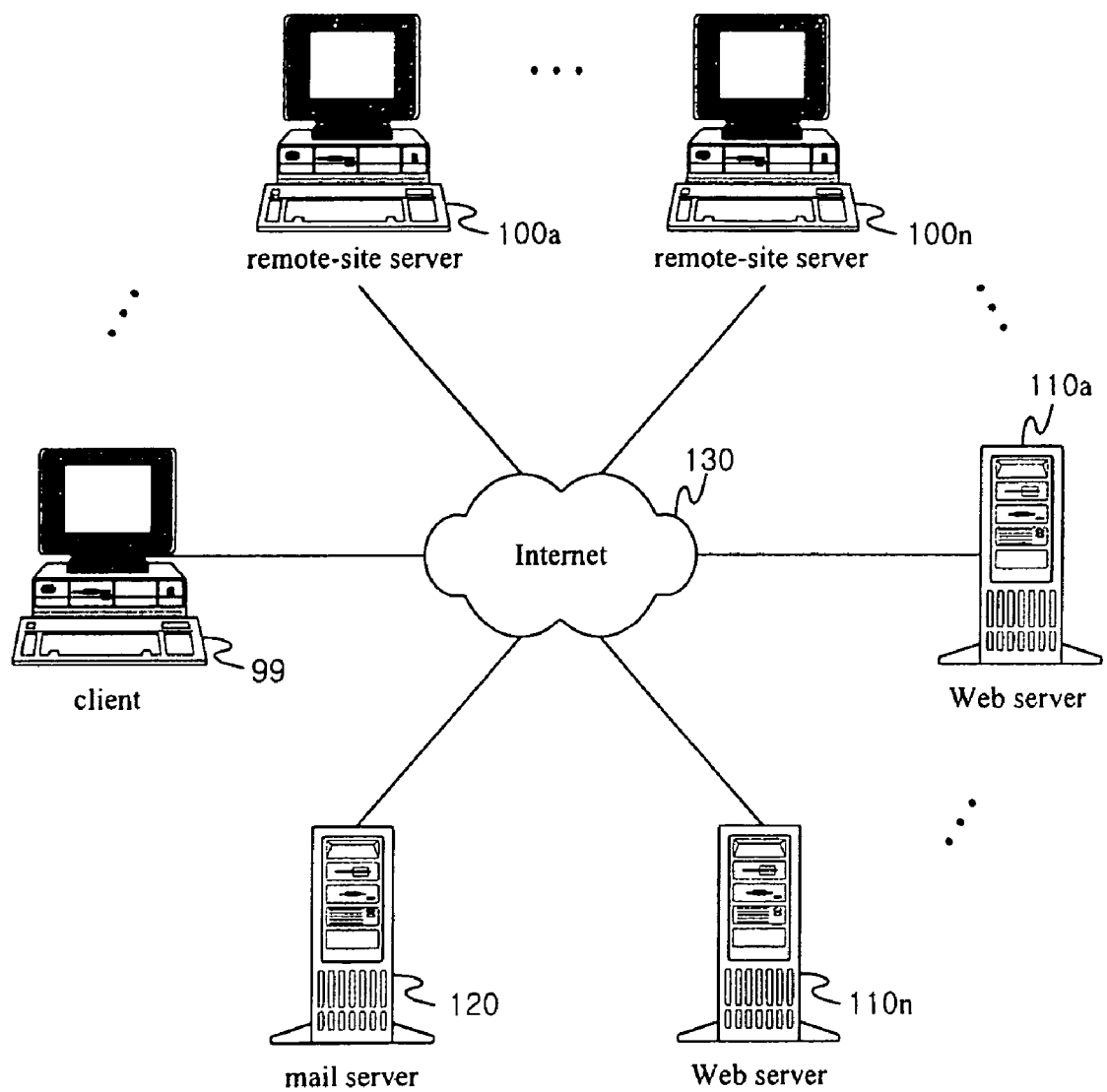

[Fig. 2a]
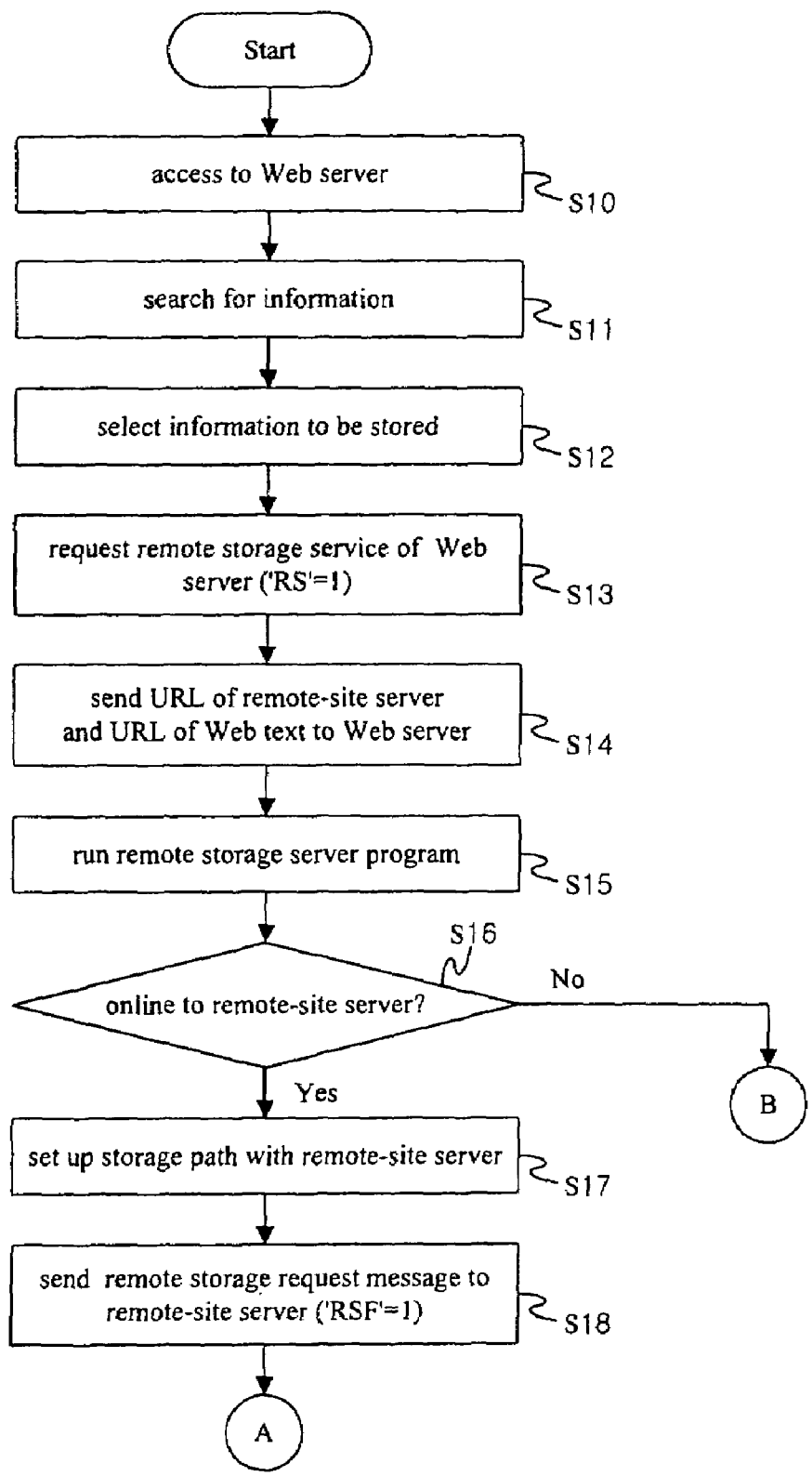

[Fig. 2b]
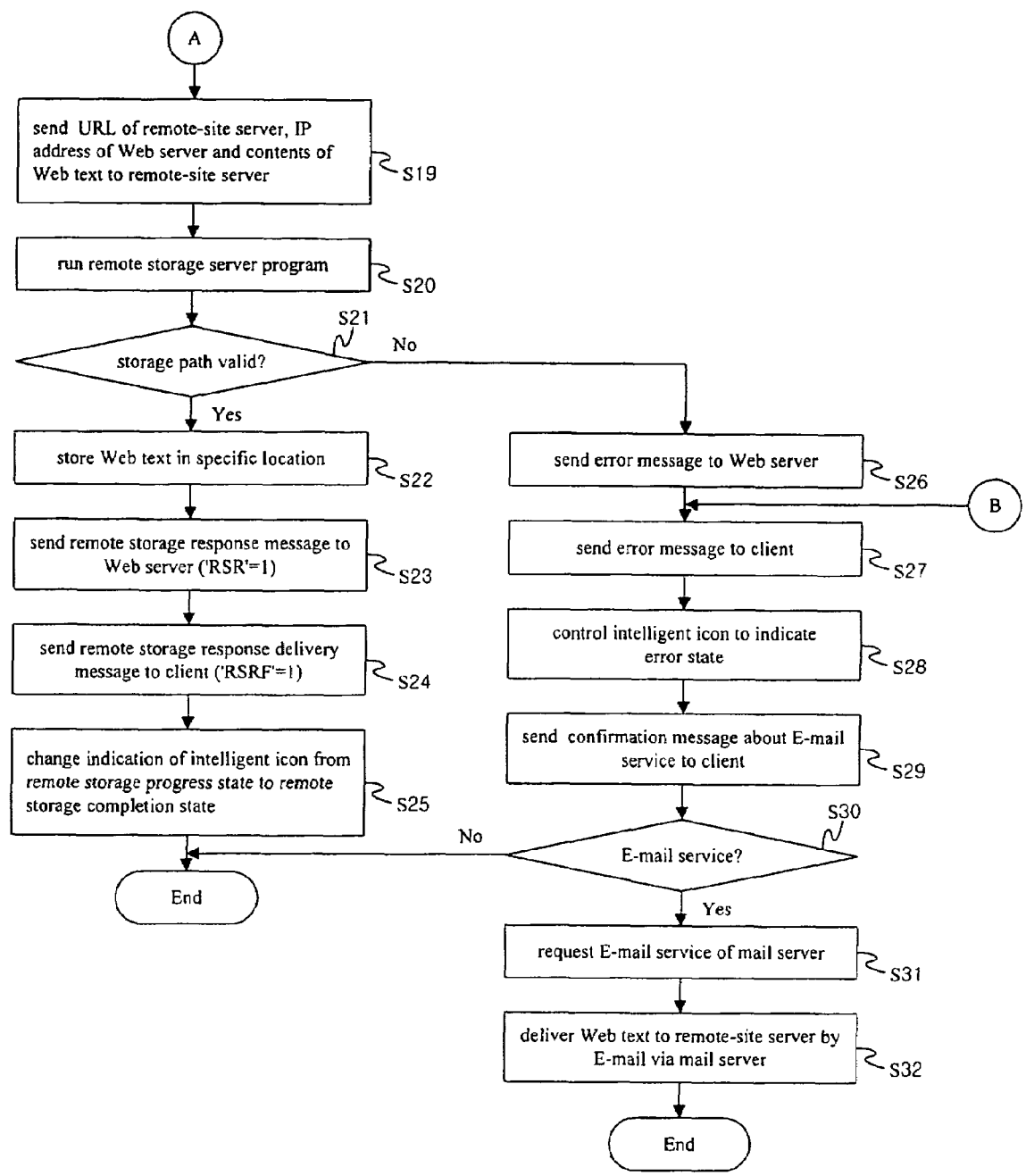

[Fig. 3]
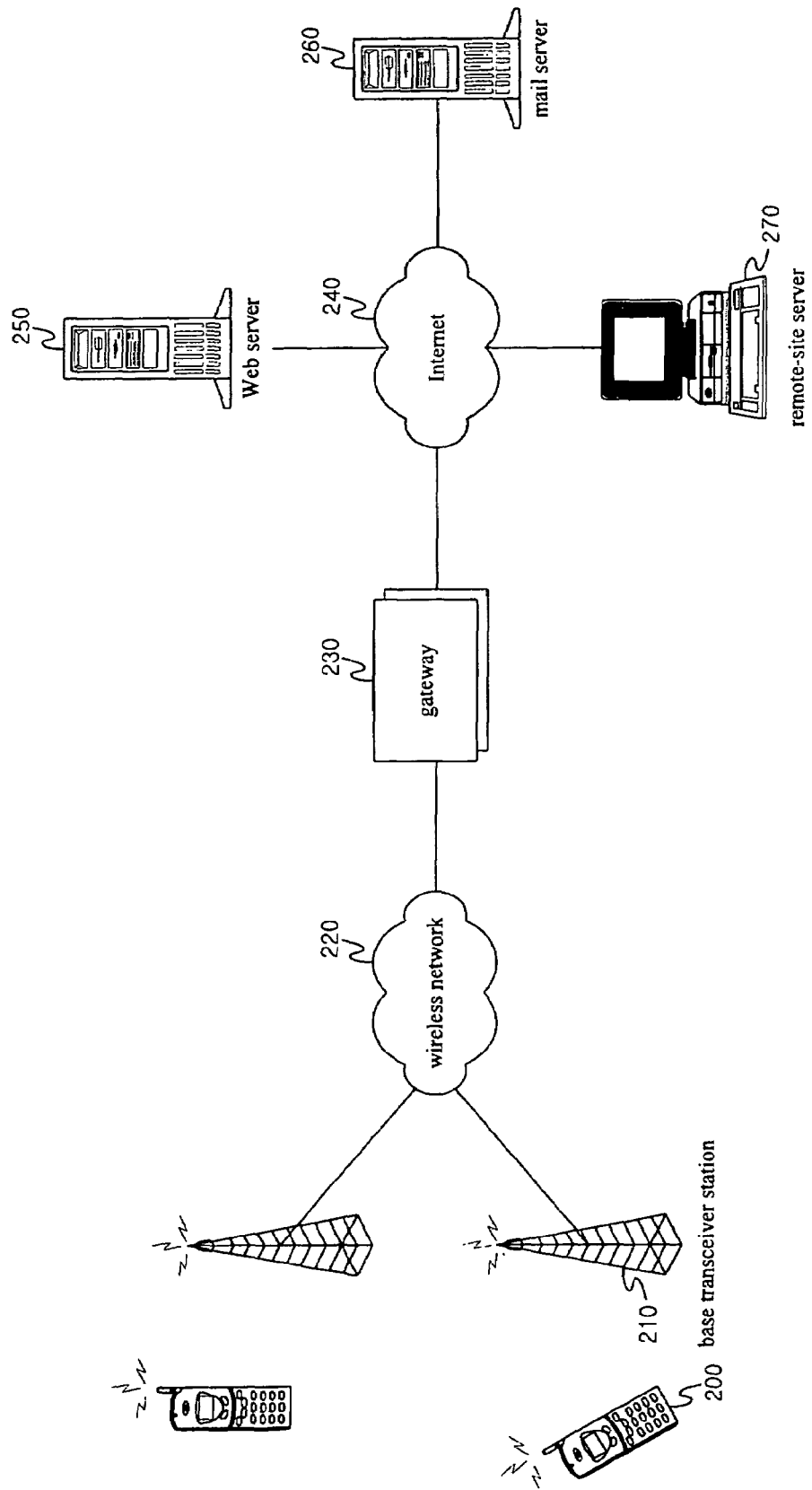

[Fig. 4a]
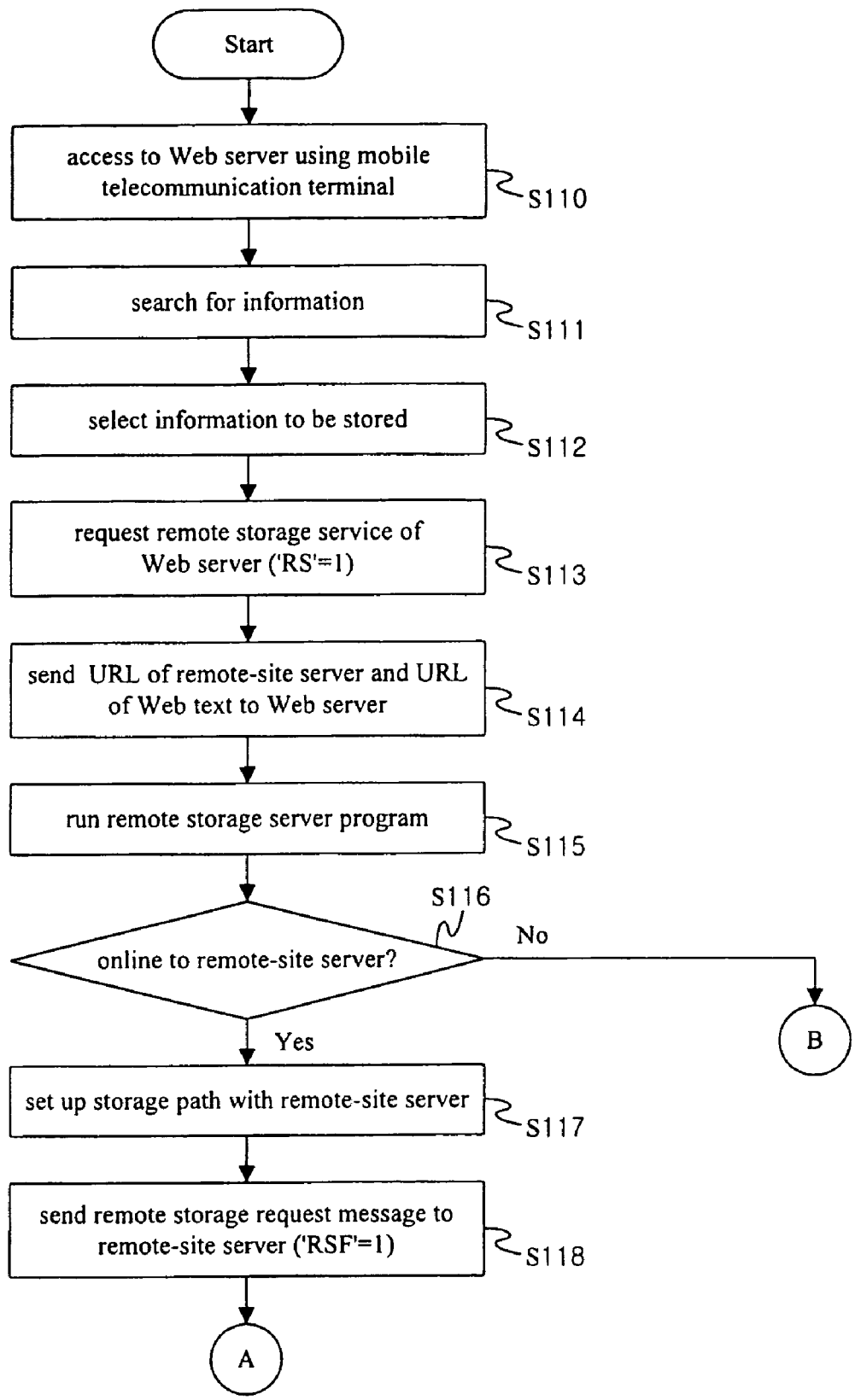

[Fig. 4b]
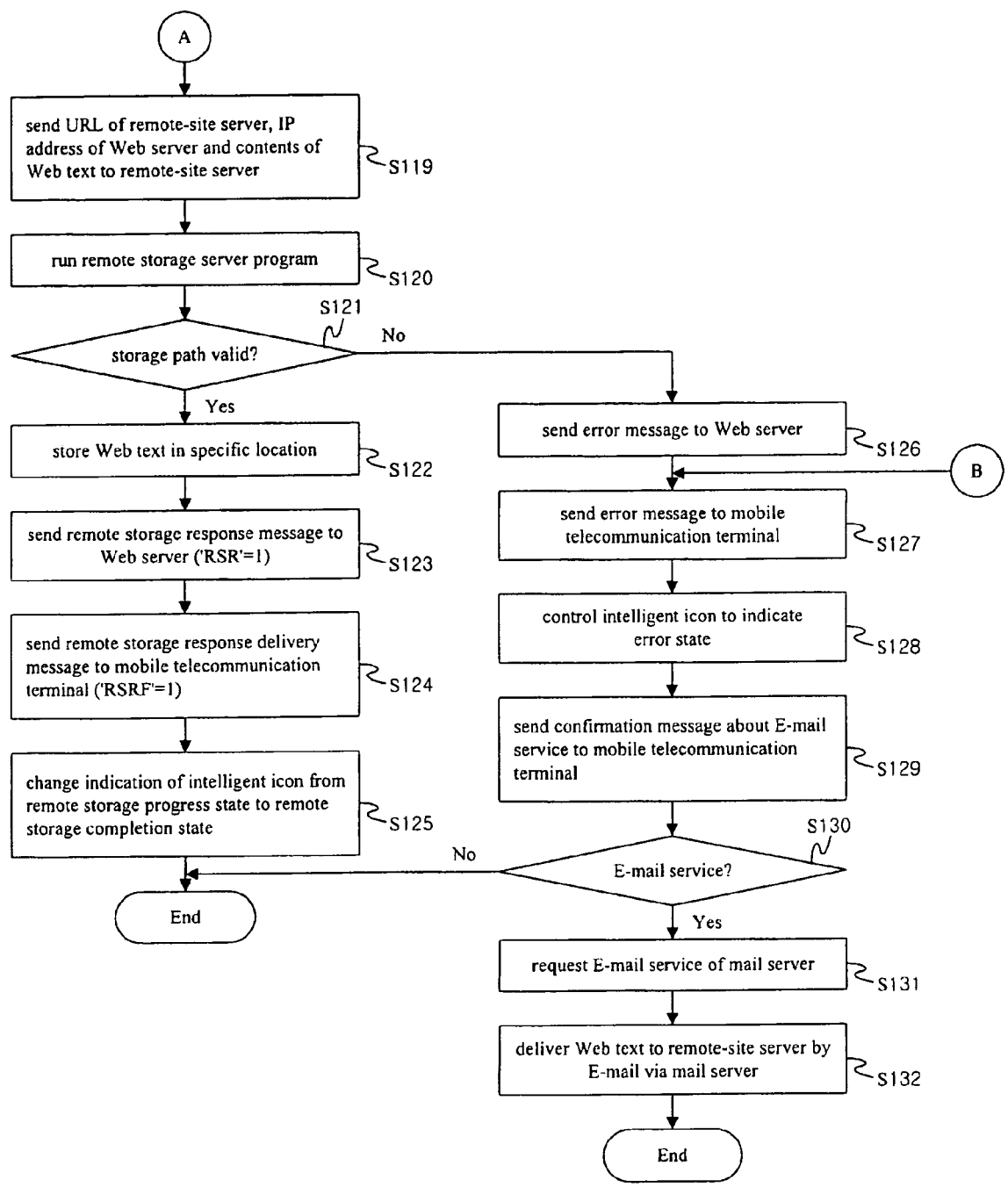

[Fig. 5]
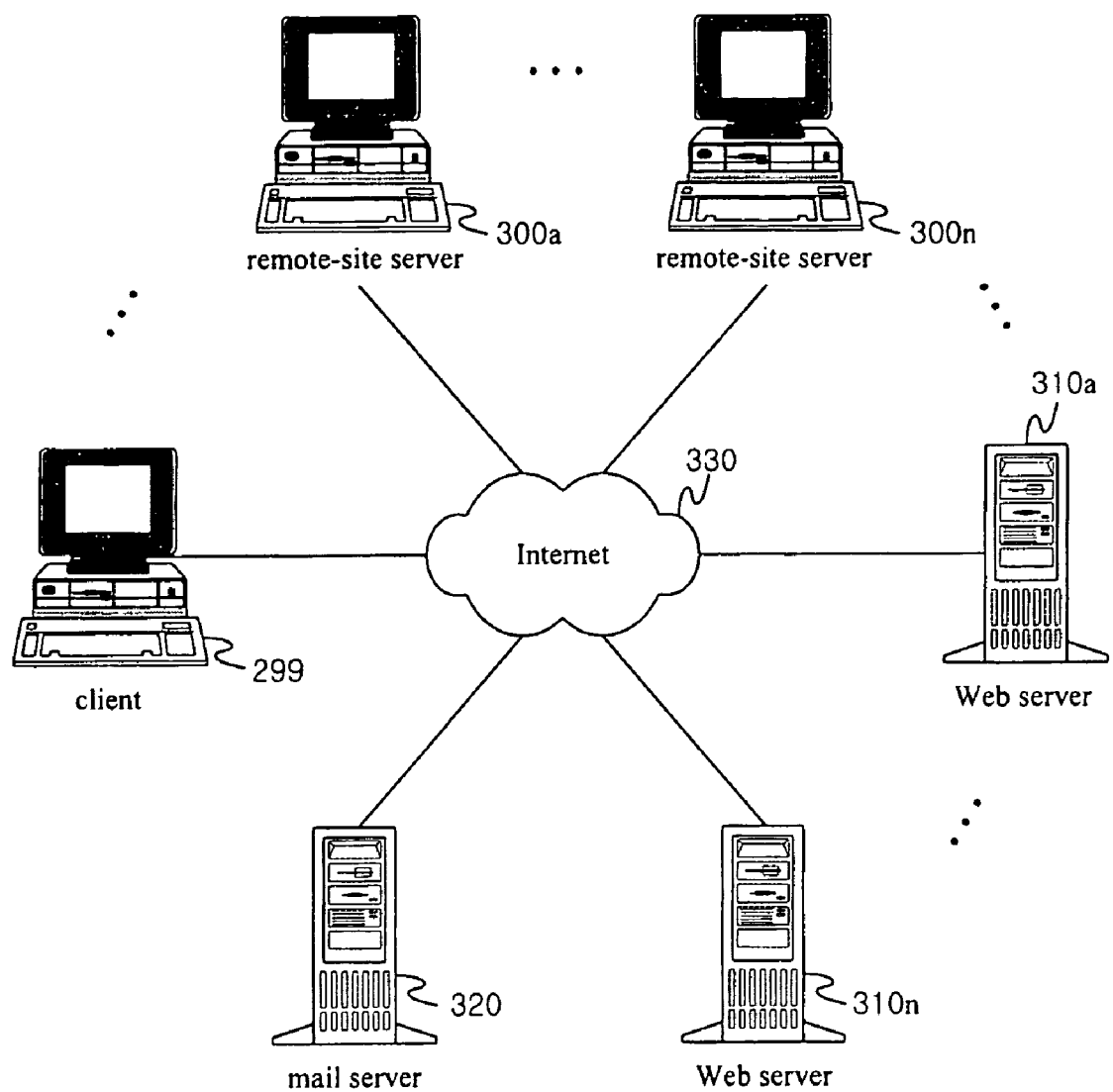

[Fig. 6a]
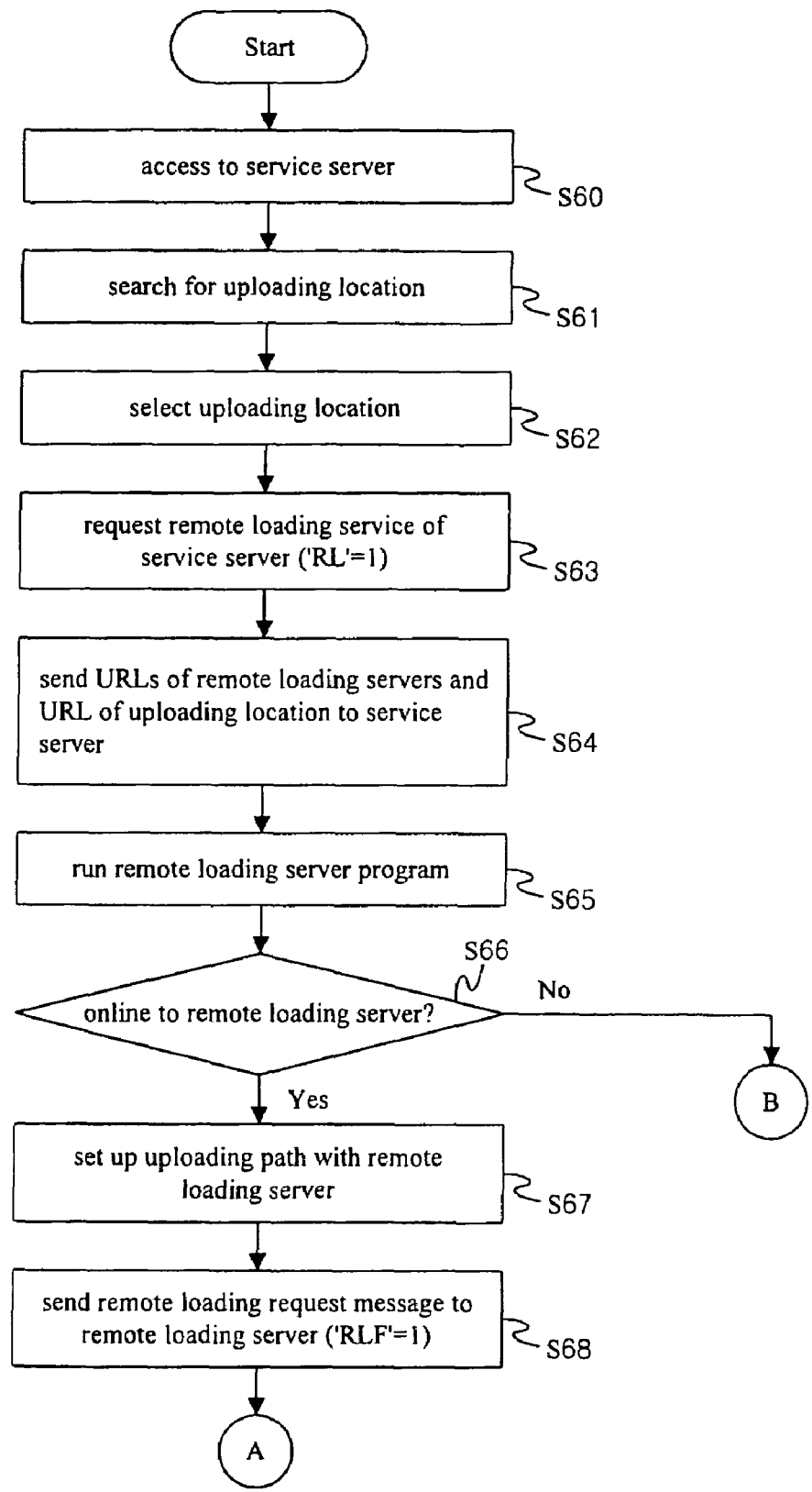

[Fig. 6b]
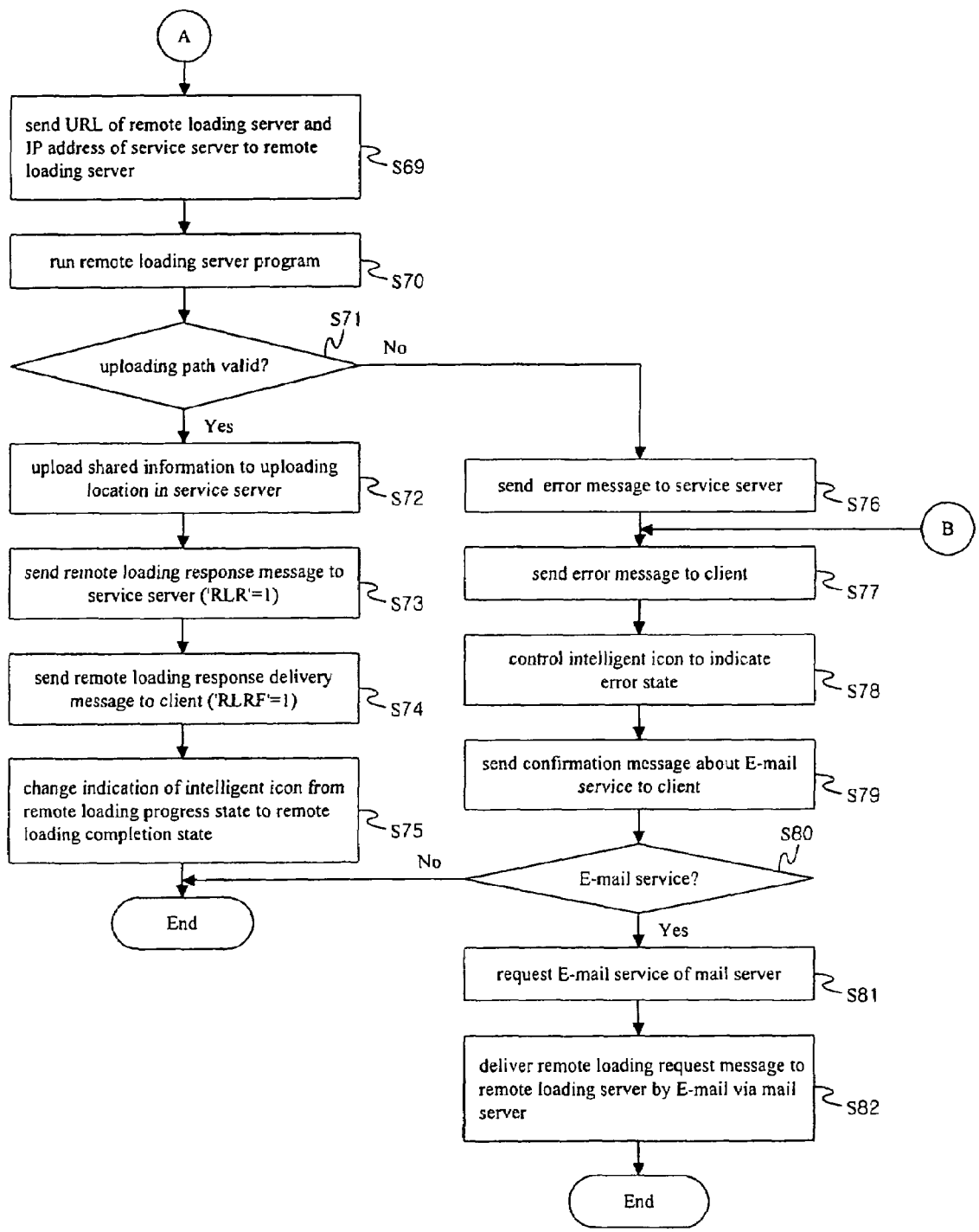

[Fig. 7]
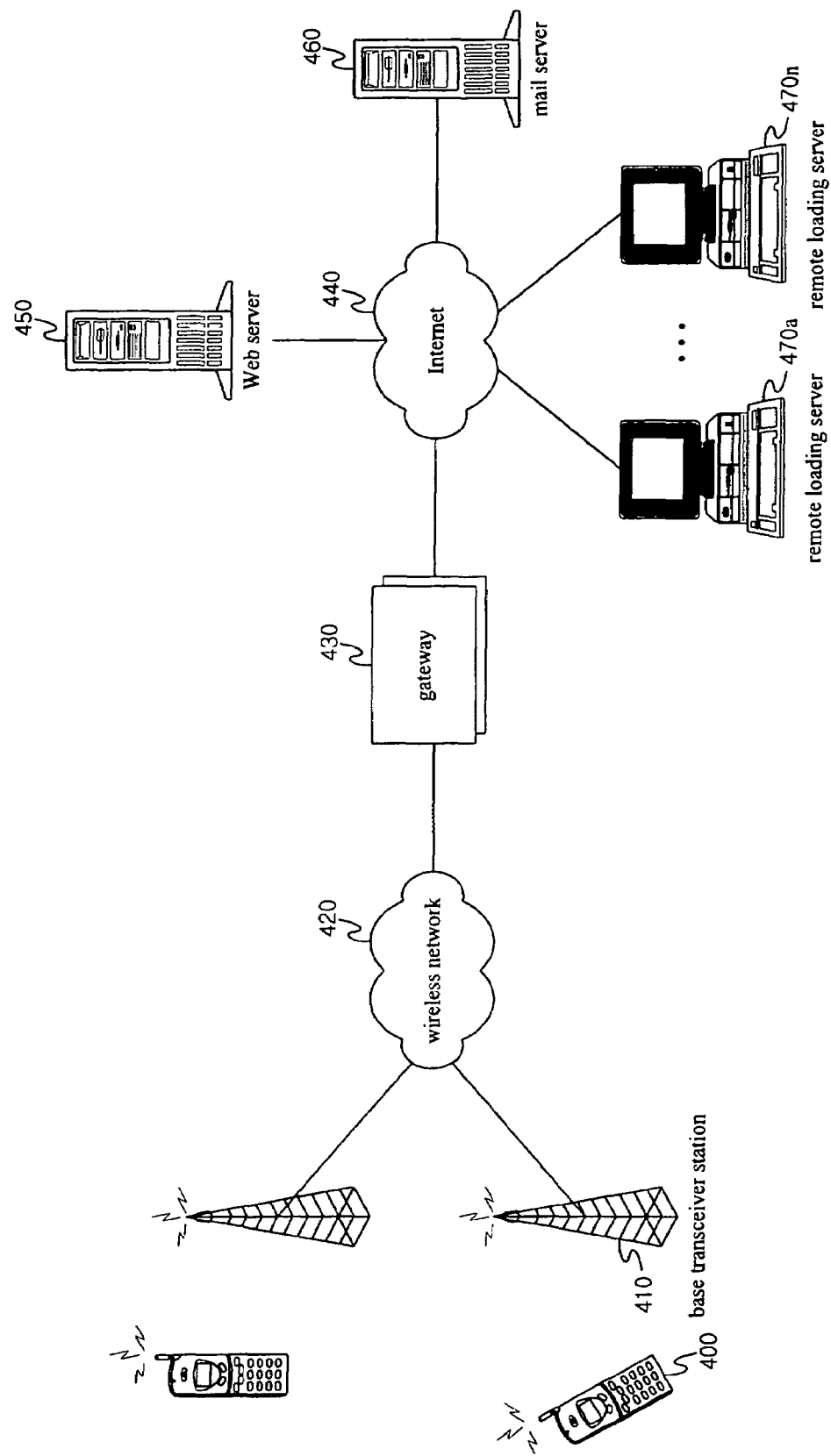

[Fig. 8a]
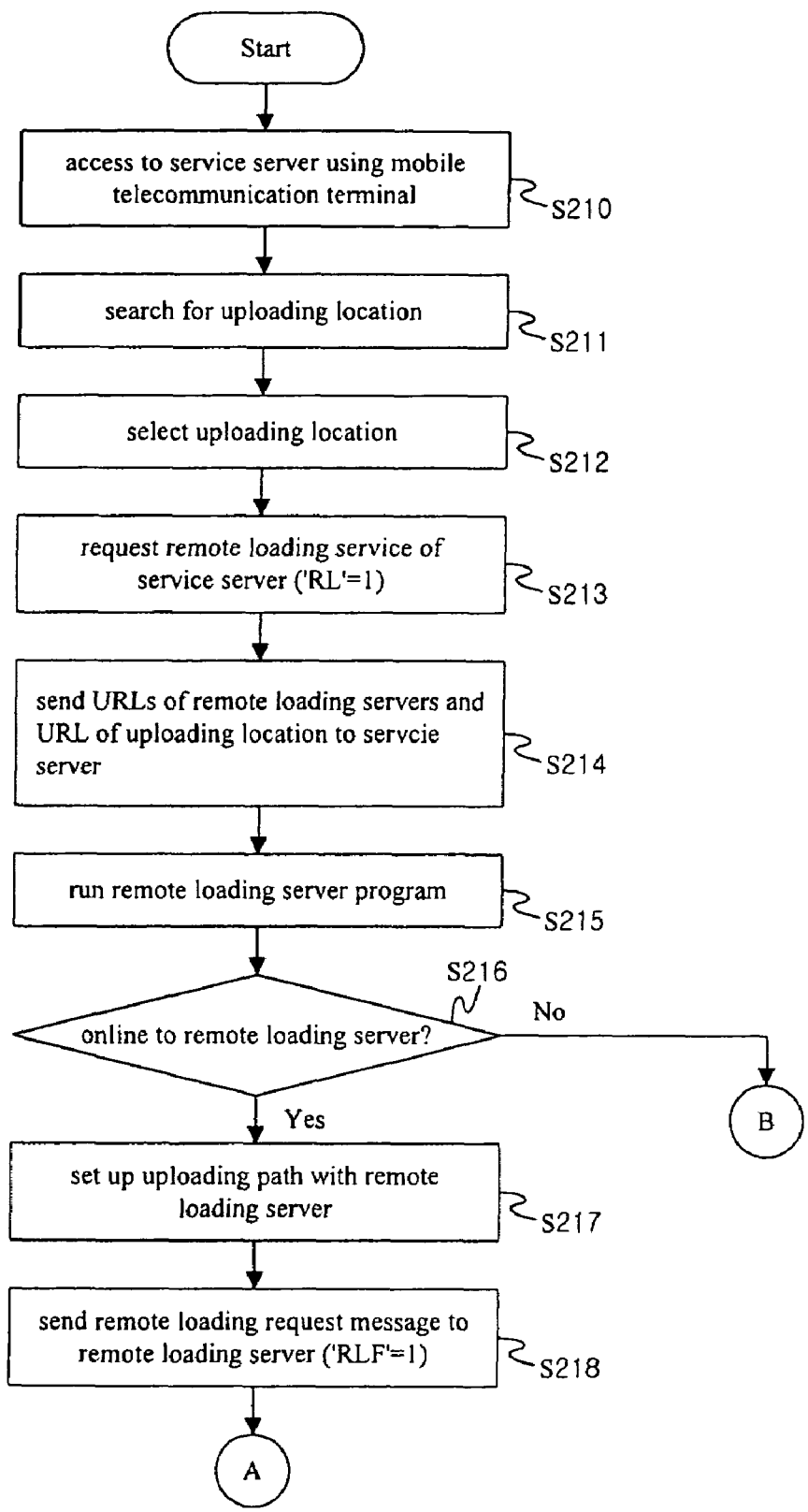

[Fig. 8b]
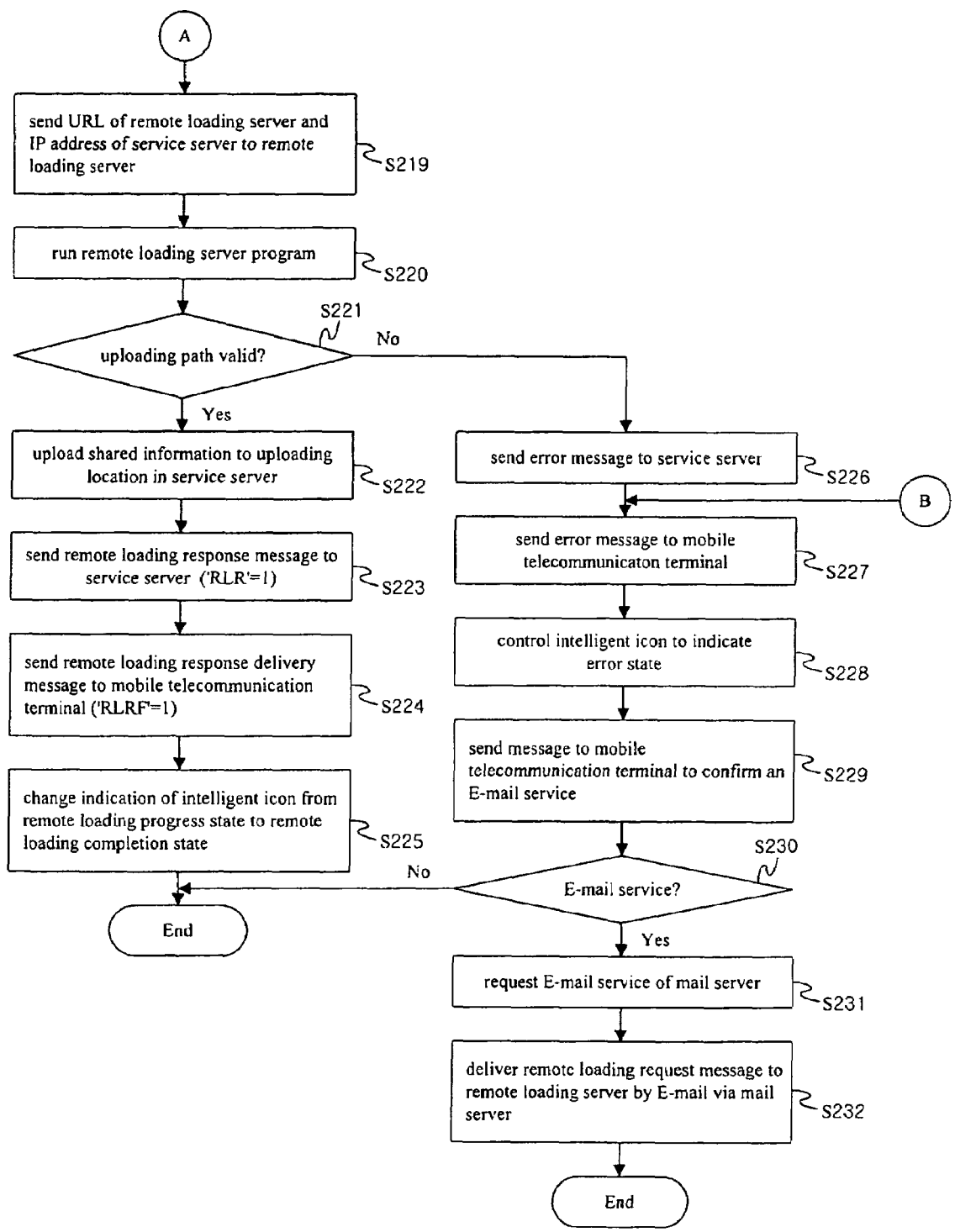

[Fig. 9]
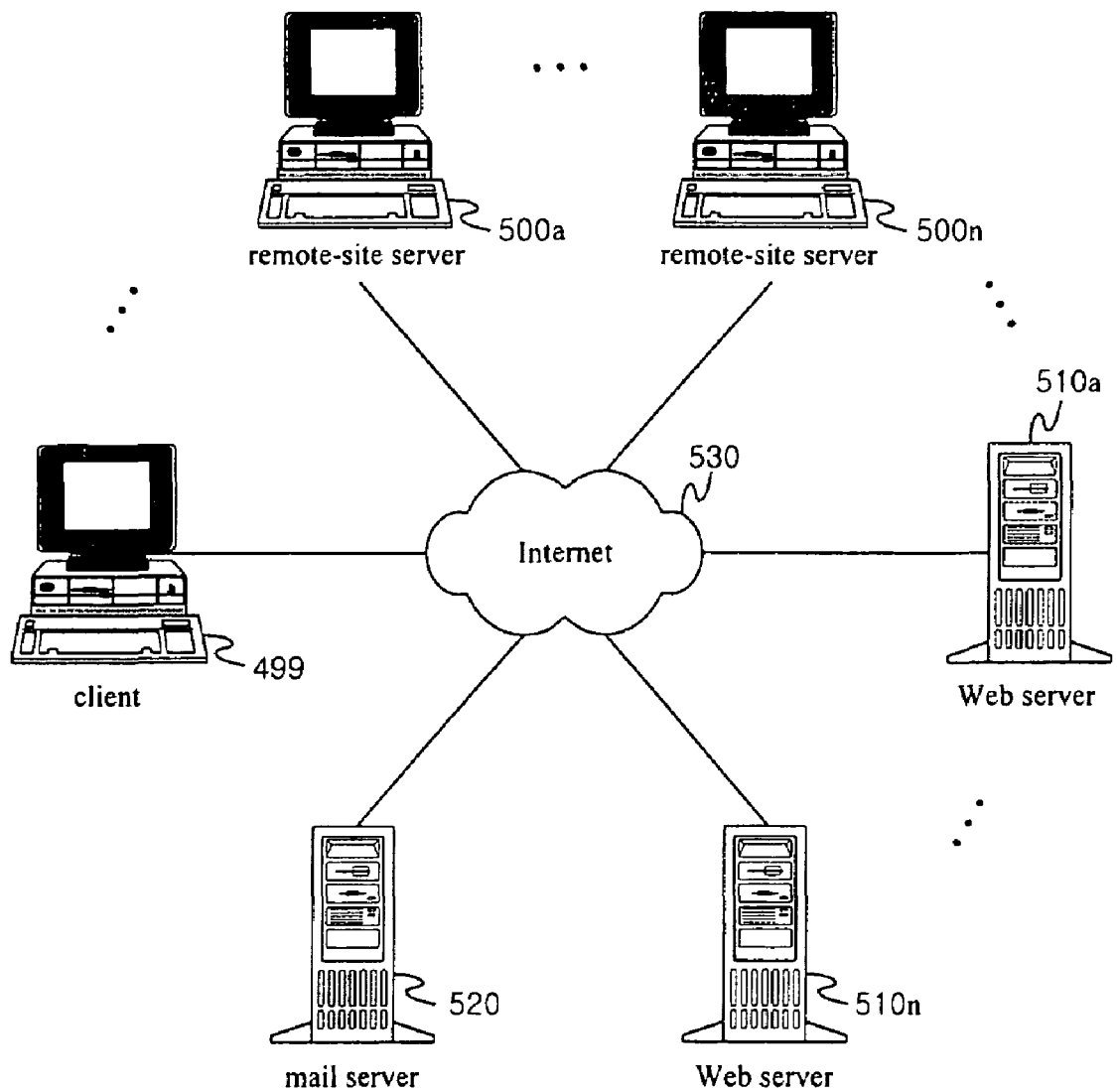

[Fig. 10a]
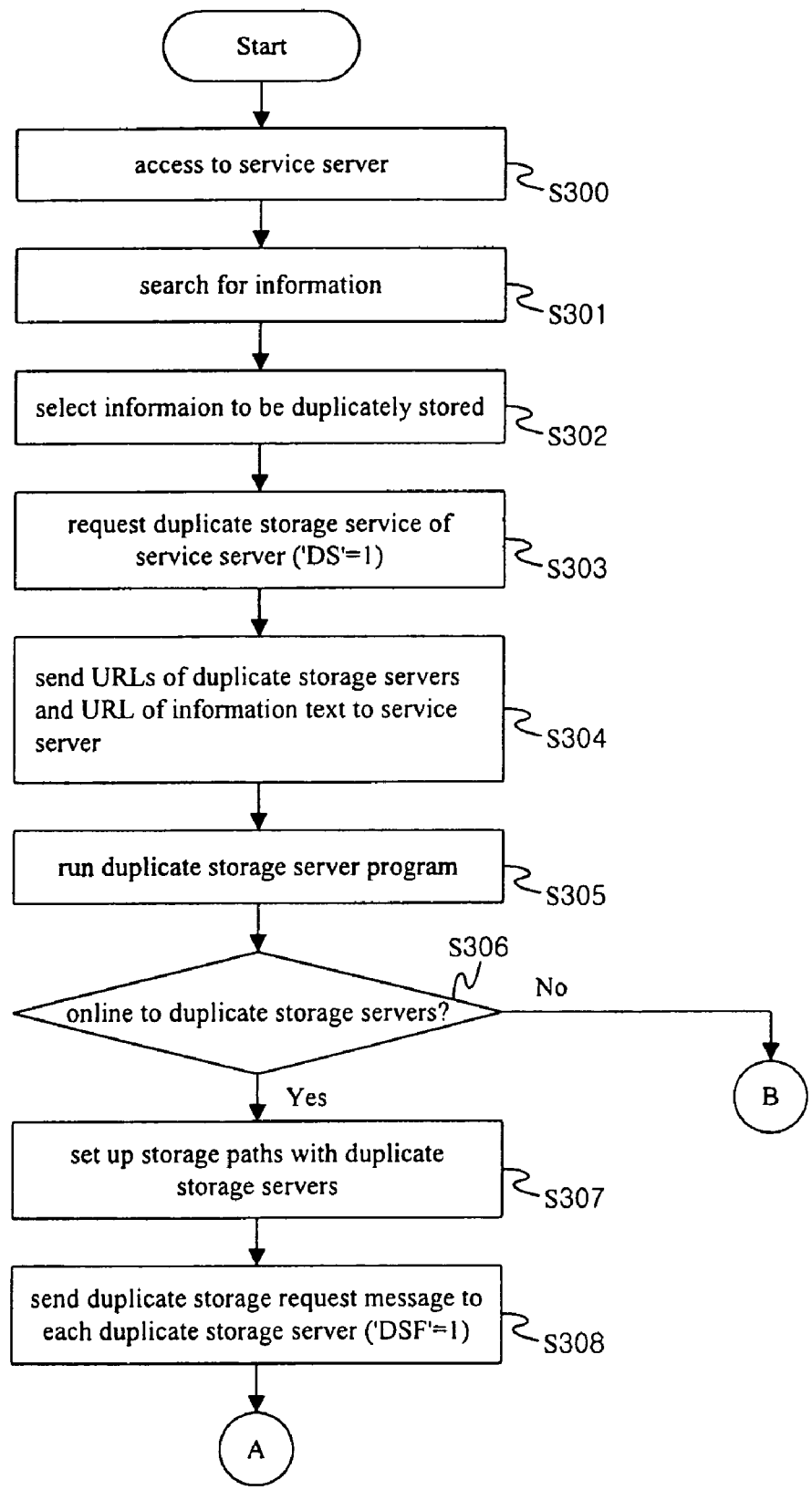

[Fig. 10b]
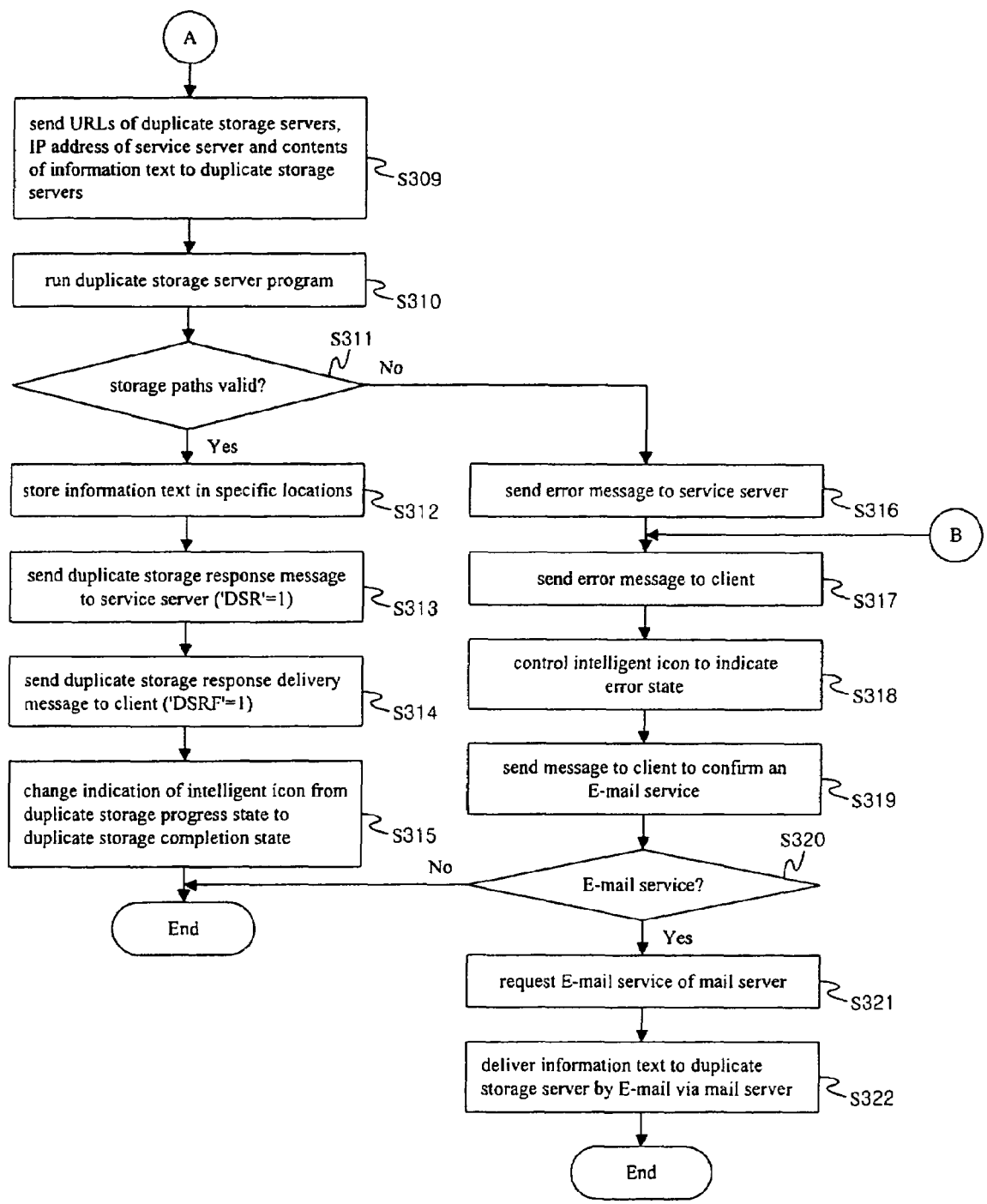

[Fig. 11]
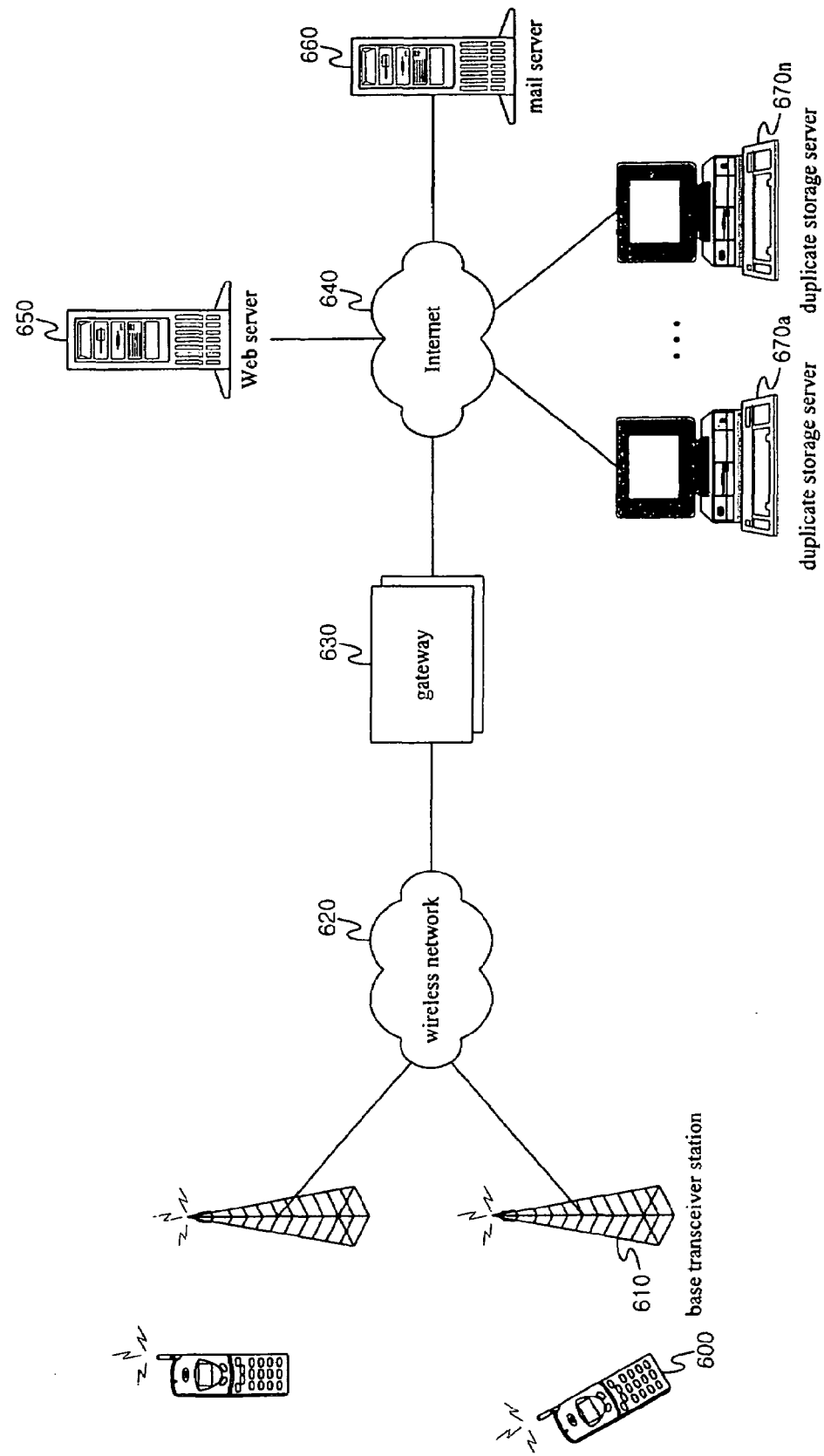

[Fig. 12a]
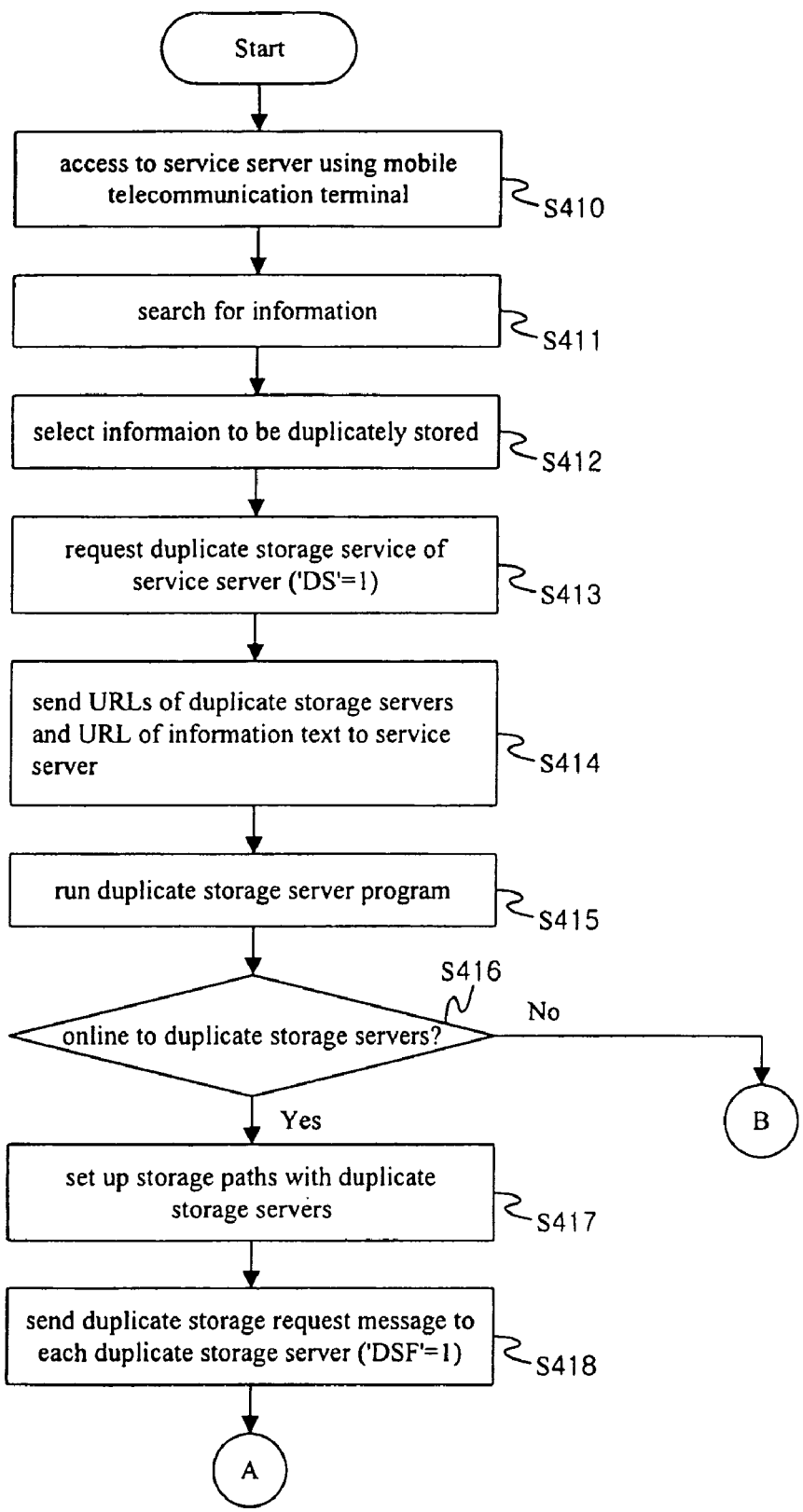

[Fig. 12b]
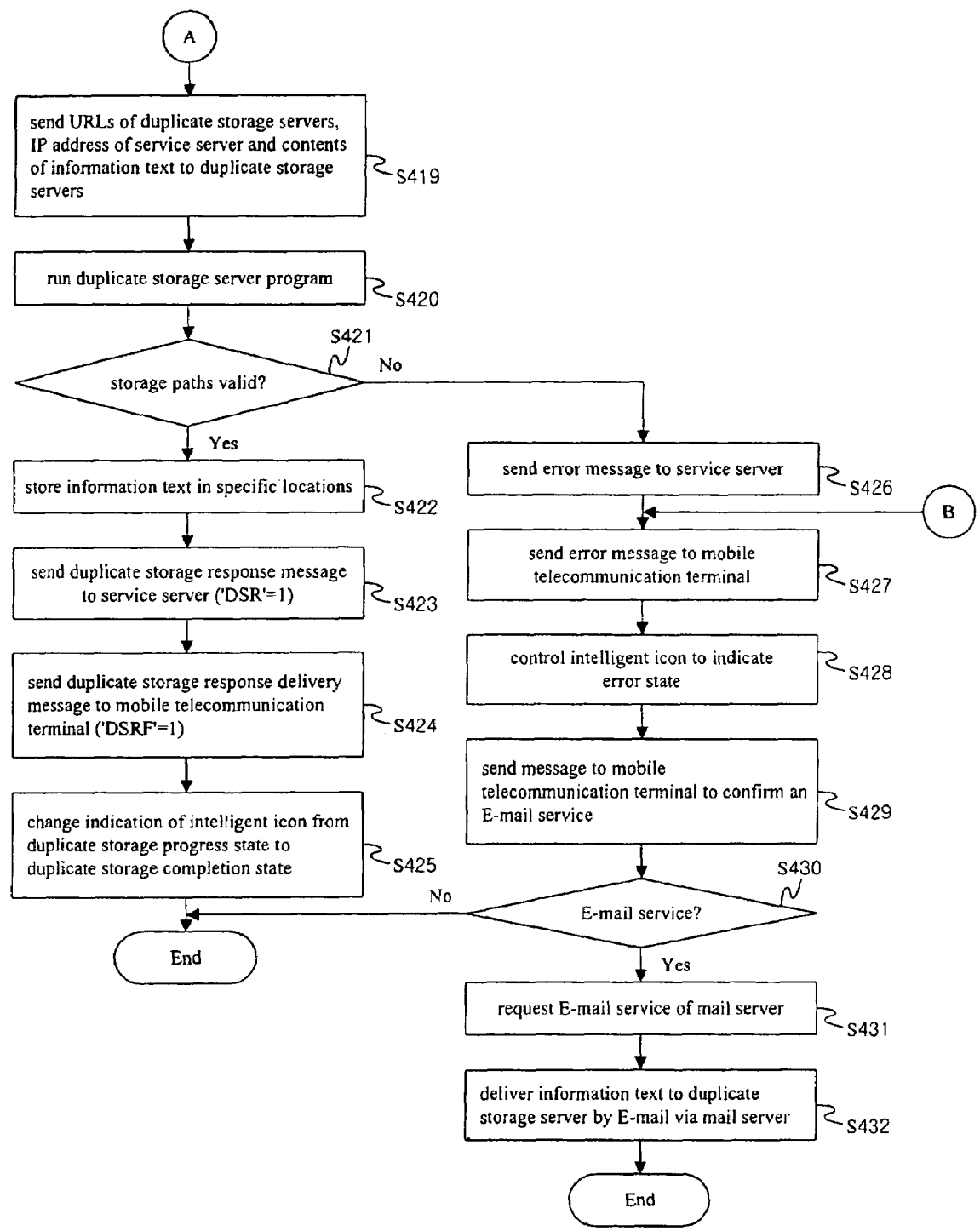

REMOTE SAVING METHOD OF THE SEARCH INFORMATION ON THE INTERNET

TECHNICAL FIELD OF THE INVENTION

The present invention relates to a method for remote storing of information searched on the Internet, wherein shared information on the Internet is stored remotely in one or more remote computers or loaded remotely from remote computers.

BACKGROUND OF THE INVENTION

Owing to the recent activation of information sharing over the Internet, information users scattered over the whole world have constructed primitive information texts of fixed formats, in particular Web texts, in their computers.

In order to acquire desired information on the Internet, information users can freely share primitive information texts distributed over various regions of the world, using a variety of communication application programs, in particular, communication programs such as a file transfer service (e.g., file transfer protocol: FTP), a remote computer connection service (e.g., Telnet), a Web browser, etc.

In order to search for a desired Web text, an information searcher searches generally the Internet using a Web browser and a search engine. After the search, the information searcher may wish to store the searched results or to have them printed out through a printer.

In the case where the information searcher searches for desired information on the Internet at a location distant from his ordinary working site, he may want to store the searched information in his computer located in his ordinary working site, if necessary.

In particular, when the information searcher gains access to the Internet using a terminal unit having a small memory capacity such as a mobile telecommunication terminal or a personal information terminal, for example, a personal digital assistant (PDA), and searches for a desired text, he is likely to wish to store the searched information in another storage system having a larger memory capacity, located in a remote site, because said terminal unit is not capable of storing the searched information due to its small memory capacity.

Accordingly, there is a recent need for development of a method for storing a text searched on the Internet by using a mobile telecommunication terminal or personal information terminal or a computer, in a remote storage system located distant from said search means.

On the other hand, an information user generally uploads an information text to be shared by him to the Internet using a Web browser, a file transfer service such as an FTP, etc.

The information user may conduct his ordinary works at several computers distributed on the Internet or under working environments where the distributed computers are frequently interrupted by disconnection. In these cases, the information user needs to store the shared information on the Internet safely at several different places and to selectively upload the stored information to the Internet.

Especially, in the case where the information user wishes to upload a shared text on the Internet to a server using a terminal unit having a small memory capacity such as a mobile telecommunication terminal or a personal information terminal, for example, a PDA, he needs to selectively and remotely load the shared text from other remote loading systems located in remote sites to the server because said terminal unit is not able to store or process the shared text due to its small memory capacity.

Accordingly, there is a recent need for development of a method for remotely loading a shared text automatically and selectively from a mobile telecommunication terminal or personal information terminal or various other systems including a computer used by an information user, to the Internet.

SUMMARY OF THE INVENTION

Thus, the present invention, conceived to solve the above problems, aims to provide a method with which an information searcher can access a Web server on the Internet, search for desired information and store the searched information in a storage system in a remote site for a predetermined period of time.

Another objective of the present invention is to provide a method wherein an information searcher can access a Web server on the Internet, search for desired information and store the searched information automatically in a storage system in a remote site for a predetermined period of time.

A further objective of the present invention is to provide a method wherein an information user can access a service server on the Internet and remotely load shared information from a plurality of remote loading systems selectively to the service server for a predetermined period of time.

A further objective of the present invention is to provide a method wherein an information user can access a service server on the Internet and automatically upload shared information from a plurality of remote loading systems selectively to the service server for a predetermined period of time.

Another objective of the present invention is to provide a multiple storage method wherein an information searcher can access a Web server or other service server on the Internet, search for desired information, and store the searched information in a duplicate manner in a plurality of storage systems for a predetermined period of time.

It is yet another objective of the present invention to provide a multiple storage method wherein an information searcher can access a service server on the Internet, search for desired information, and automatically store the searched information in a duplicate manner in a plurality of storage systems for a predetermined period of time.

In accordance with one aspect of the present invention, the above and other objectives can be accomplished by provision of a remote storage method which comprises the first step of allowing an information searcher to access a Web server and search it for desired information; the second step of allowing the information searcher to request the Web server for a remote storage service; the third step of allowing the information searcher to send to the Web server the uniform resource locator of the searched information and that of a remote-site server in which the searched information is to be stored; the fourth step of allowing the Web server to set up a storage path with the remote-site server under the condition that it is online to the remote-site server and send a remote storage request message to the remote-site server; the fifth step of allowing the Web server to send to the remote-site server a Web text to be stored and a uniform resource locator indicative of a storage location of the Web text in the remote-site server; and the sixth step of allowing the remote-site server to store the Web text if the storage path set-up by the Web server is valid.

In accordance with another aspect of the present invention, there is provided a remote storage method which comprises the first step of allowing an information searcher to access a Web server and search it for desired information; the second step of allowing the information searcher to receive the searched information from the Web server and store it; the third step of allowing the information searcher to set up a transfer path with a remote-site server in which the searched information is to be stored; and the fourth step of allowing the information searcher to store the searched information in the remote-site server along with the set-up transfer path.

In accordance with a further aspect of the present invention, there is provided a remote storage method which comprises the first step of allowing an information searcher to access a Web server and search it for desired information; the second step of allowing the information searcher to receive the searched information from the Web server and store it; and the third step of allowing the information searcher to send the searched information by electronic mail to a remote-site server in which the searched information is to be stored.

In accordance with a further aspect of the present invention, there is provided a remote loading method which comprises the first step of allowing an information user to access a service server and search it for a location for uploading the shared information; the second step of allowing the information user to request the service server for a remote loading service; the third step of allowing the information user to send to the service server the uniform resource locator indicative of the location for uploading the shared information in the service server and the uniform resource locators of a plurality of remote loading servers which have the shared information; the fourth step of allowing the service server to set up an uploading path with any one of the remote loading servers selected by the information user under the condition that it is online to the selected remote loading server and to send a remote loading request message (to the selected remote loading server); the fifth step of allowing the selected remote loading server to send to the service server a shared information text to be remotely uploaded and the uniform resource locator indicative of the uploading location of the shared information text in the service server; and the sixth step of allowing the service server to store the shared information text if the uploading path is valid.

In accordance with a further aspect of the present invention, there is provided a remote loading method which comprises the first step of allowing an information user to access a service server and search it for a location for uploading the shared information; the second step of allowing the information user to receive information about the uploading location from the service server and store it; the third step of allowing the information user to set up a transfer path with selected remote loading server having the shared information and to send the uploading resource location information of said server to the selected remote loading server; and the fourth step of allowing the selected remote loading server to upload the shared information to the uploading location in the service server if the uploading path to the service server is valid.

In accordance with a further aspect of the present invention, there is provided a remote loading method which comprises the first step of allowing an information user to access a service server and search it for a location for uploading the shared information; the second step of allowing the information user to receive information about the location for uploading from the service server and store it; the third step of allowing the information user to set up a transfer path with a selected one of a plurality of remote loading servers having the shared information and to receive the shared information from the selected remote loading server; and the fourth step of allowing the information user to upload the shared information to the uploading location in the service server if an uploading path to the service server is valid.

In accordance with a further aspect of the present invention, there is provided a remote storage method comprising the first step of allowing an information searcher to access a Web server and search it for desired information; the second step of allowing the information searcher to request a remote storage service of the Web server; the third step of allowing the information searcher to send to the Web server a uniform resource locator of the searched information and uniform resource locators of a plurality of remote-site clients in which the searched information is to be stored; the fourth step of allowing the Web server to set up storage paths with the respective remote-site client under the condition that it is online to the respective remote-site client and to send a remote storage request message to each of said remote-site clients; the fifth step of allowing the Web server to send to each of said remote-site clients a Web text to be stored and a uniform resource locator indicative of a storage location of the Web text in each of the remote-site clients; and the sixth step of allowing each of the remote-site clients to store the Web text if the corresponding storage path set-up by the Web server is valid.

In accordance with another aspect of the present invention, there is provided a remote storage method which comprises the first step of allowing an information searcher to access a Web server and search it for desired information; the second step of allowing the information searcher to receive the searched information from the Web server and store it; the third step of allowing the information searcher to set up transfer paths with a plurality of remote-site clients in which the searched information is to be stored, respectively; and the fourth step of allowing the information searcher to store the searched information in the remote-site clients along with the set-up transfer paths.

In accordance with yet another aspect of the present invention, there is provided a remote storage method which comprises the first step of allowing an information searcher to access a Web server and search it for desired information; the second step of allowing the information searcher to receive the searched information from the Web server and store it; and the third step of allowing the information searcher to send the searched information using electronic mail to a plurality of remote-site clients in which the searched information is to be stored.

In order to realize the present invention on a Web browser or search site, a new or expanded transfer protocol, a client program (the Web browser or search site), a server program, and the like is required.

A new or expanded Web server and Web database are required to be constructed to provide either a remote storage function or remote loading function to users on the basis of the above realization.

It is assumed herein that a user assigns priorities to remote-site server computers for the remote storage or remote-site server computers for the remote loading in advance.

BRIEF DESCRIPTION OF THE DRAWINGS

The present invention will be more clearly understood from the following description taken in conjunction with the accompanying drawings, in which:

FIG. 1 is a drawing showing an Internet network to which the method for remote storing of information searched on the Internet in accordance with the preferred embodiment of the present invention applies;

FIGS. 2a and 2b are flowcharts illustrating the remote storage method in accordance with the preferred embodiment of the present invention;

FIG. 3 is a drawing showing a wireless Internet network to which the method for remote storing of information searched on the Internet in accordance with another embodiment of the present invention applies;

FIGS. 4a and 4b are flowcharts illustrating the remote storage method in accordance with another embodiment of the present invention;

FIG. 5 is a drawing showing an Internet network to which the method for remote loading of information on the Internet in accordance with another embodiment of the present invention applies;

FIGS. 6a and 6b are flowcharts illustrating the remote loading method in accordance with another embodiment of the present invention;

FIG. 7 is a drawing showing a wireless Internet network to which the method for remote loading of information to the Internet in accordance with another embodiment of the present invention applies;

FIGS. 8a and 8b are flowcharts illustrating the remote loading method in accordance with another embodiment of the present invention;

FIG. 9 is a drawing showing an Internet network to which the method for duplicate storing of information searched and accessed on the Internet in accordance with another embodiment of the present invention applies;

FIGS. 10a and 10b are flowcharts illustrating the duplicate storage method in accordance with another embodiment of the present invention;

FIG. 11 is a drawing showing a wireless Internet network to which the method for duplicate storing of information searched and accessed on the Internet in accordance with another embodiment of the present invention applies; and FIGS. 12a and 12b are flowcharts illustrating the duplicate storage method in accordance with another embodiment of the present invention.

DETAILED DESCRIPTION OF THE PREFERRED EMBODIMENTS

FIG. 1 is a drawing showing an Internet network to which the method for remote storing of information searched on the Internet in accordance with the preferred embodiment of the present invention applies and FIGS. 2a and 2b are flowcharts illustrating the remote storage method in accordance with the preferred embodiment of the present invention.

First, an information searcher accesses a desired one of Web servers 110a–110n on the Internet 130 using a client 99 at step S10 and searches the accessed Web server (hereinafter, "110") for desired information using a Web browser or search engine at step S11.

The Web browser or search engine used here may preferably be a new or expanded client program that provides the information searcher with a remote storage menu or icon and, when a remote storage service is in progress, with an intelligent icon indicative of the progress state.

If the information searcher has found the desired information, then he selects the information to be stored from the searched information at step S12 and clicks on the remote storage menu or icon to request the remote storage service of the accessed Web server 110 at step S13.

A new or expanded transfer protocol may preferably be used for the transfer of information between the client 99 and the Web server 110 and have an expanded field for enabling the client 99 to request the Web server 110 to execute a remote storage function.

The expanded field may include a flag bit (hereinafter, 'RS') indicative of the execution of the remote storage function. For example, when the client 99 sets the flag bit to 1, or RS=1, the Web server 110 runs a remote storage server program capable of additionally performing the remote storage function.

When the client 99 requests a remote storage service of the accessed Web server 110, it sends to the Web server 110 a uniform resource locator (URL) indicative of the location of a Web text in the Web server 110 to be stored and a URL of a desired one of remote-site servers 100a–100n in which the Web text is to be stored, together with other additional information at step S14.

Upon receiving the remote storage service request from the client 99, the accessed Web server 110 checks the flag bit in the expanded field and runs the remote storage server program at step S15 if the flag bit has been set to 1. As a result, the Web server 110 checks the status of the remote-site server (hereinafter, "100") desired by the client 99 at step S16 to determine whether it is online to the remote-site server 100. If the Web server 110 is online to the remote-site server 100, then it sets up a storage path with the server 100 at step S17.

A new or expanded transfer protocol may preferably be used for the transfer of information between the Web server 110 and the remote-site server 100 and have an expanded field for enabling the Web server 110 to request the remote-site server 100 to execute a remote storage function.

The expanded field may include a flag bit (hereinafter, 'RSF') indicative of the execution of the remote storage function. For example, when the Web server 110 sets the flag bit to 1, or RSF=1, the remote-site server 100 runs a remote storage server program capable of additionally performing the remote storage function.

After setting up the storage path with the remote-site server 100, the Web server 110 sets the flag bit in the expanded field to 1, or RSF=1, and sends to the remote-site server 100 a remote storage request message containing a URL indicative of a storage location of the Web text in the server 100, an Internet protocol (IP) address of the server 110, the contents of the Web text to be stored and other additional information, at steps S18 and S19, respectively.

Upon receiving the remote storage request message from the Web server 110, the remote-site server 100 checks the flag bit in the expanded field of the received request message and runs the remote storage server program at step S20 if the flag bit has been set to 1, or RSF=1. As a result, the remote-site server 100 checks the status of the storage path designated by the Web server 110 at step S21 to determine whether it is valid. In the case where the designated storage path is valid, the remote-site server 100 stores the contents of the Web text received from the Web server 110 in a specific location of its storage unit at step S22.

Thereafter, in order to notify the working state the remote-site server 100 sends to the Web server 110 a remote storage response message including an expanded flag bit set to 1, or RSR=1, at step S23.

Upon receiving the remote storage response message including the expanded flag bit set to 1, or RSR=1, from the remote-site server 100, the Web server 110 checks the flag bit and then sends a remote storage response delivery message containing information received from the remote-site server 100 to the client 99 that has requested the remote storage service, at step S24.

At this time, the remote storage response delivery message sent to the client 99 includes an expanded flag bit set to 1, or RSRF=1.

Upon receiving the remote storage response delivery message from the Web server 10, including the expanded flag bit set to 1, or RSRF=1, the service requesting client 99 determines whether the associated remote storage work has been completed. If the associated remote storage work has been completed, the client 99 informs the information searcher by changing the indication of the intelligent icon from the remote storage progress state to the remote storage completion state at step S25.

On the other hand, in the case where it is determined that the Web server 110 is not online to the remote-site server 100, the Web server 110 sends an error message to the client 99 (at steps S26 and S27).

Then, the client 99 controls the intelligent icon at step S28 to indicate an error state and the Web server 110 sends a confirmation message to the client 99 at step S29 to confirm at step S30 whether the information searcher wants to deliver the Web text to the remote-site server 100 by electronic mail (E-mail). Unless the information searcher wants to deliver the Web text by E-mail, then the Web server 110 ends the entire operation. However, if the information searcher wants to deliver the Web text by E-mail, then the Web server 110 requests a mail server 120 for an E-mail service at step S31.

Subsequently, the mail server 120 delivers the Web text to the remote-site server 100 by E-mail at step S32 and the entire operation ends.

On the other hand, in the case where it is determined that the storage path designated by the Web server 110 is not valid, the remote-site server 100 sends an error message to the Web server 110 at step S26.

Upon receiving the error message from the remote-site server 100, the Web server 110 sends it further to the client 99 at step S27.

In response to the error message from the Web server 110, the client 99 controls the intelligent icon at step S28 to indicate an error state, and the Web server 110 sends a confirmation message to the client 99 at step S29 to confirm at step S30 whether the information searcher wants to deliver the Web text to the remote-site server 100 by E-mail. Unless the information searcher wants to deliver the Web text by E-mail, the Web server 110 ends the entire operation. In the case where the information searcher wants to deliver the Web text by E-mail, the Web server 110 requests the mail server 120 for an E-mail service at step S31.

Thereafter, the mail server 120 delivers the Web text to the remote-site server 100 by E-mail at step S32 and the entire operation ends.

On the other hand, the Web server 110 may show storage situation of the searched information in a local or remote backup space using a graph or icon. The Web server 110 may also show a storage tree indicative of a storage structure and connection state of a target computer in which the searched information is to be stored.

Although the preferred embodiment of the present invention describes only the case of storing searched information, the present invention may also be implemented to print the searched information as well as to store it, or to print it alone.

FIG. 3 is a diagram showing a wireless Internet network to which the method for remote storing of information searched on the Internet in accordance with another embodiment of the present invention applies and FIGS. 4a and 4b are flowcharts illustrating the remote storage method in accordance with another embodiment of the present invention.

Said wireless Internet network comprises a mobile telecommunication terminal 200, equipped with an external command input unit for inputting external command, said terminal 200 converts the inputted command into a radio frequency (RF) signal suitable to a data service and transmits the converted RF signal; a base transceiver station 210 which receives the RF signal transmitted from the mobile telecommunication terminal 200 and demodulates it into the original command; a wireless network 220 which functions to output the command demodulated by the base transceiver station 210 together with an identification (ID) number of the mobile telecommunication terminal 200 according to a protocol for an Internet service; a gateway 230 which receives an output signal from the wireless network 220 and converts the received signal into a transmission control protocol/Internet protocol (TCP/IP) signal or hypertext transfer protocol (HTTP) signal suitable to Internet connection; the Internet 240 connects the gateway 230 to other networks for execution of operation associated with the command from the gateway 230; a Web server 250 which provides Web information in response to the command from the Internet 240; a mail server 260; and a remote-site server.

First, an information searcher accesses the Web server 250 on the Internet 240 using the mobile telecommunication terminal 200 at step S110 and searches the accessed Web server 250 for desired information using a Web browser or search engine at step S111.

The used Web browser or search engine may preferably be a new or expanded client program that provides the information searcher with a remote storage menu or icon and, when a remote storage service is in progress, with an intelligent icon indicative of the progress state.

If the information searcher has found the desired information, then he selects the information to be stored from the searched information at step S112 and clicks on the remote storage menu or icon to request the remote storage service of the Web server 250 at step S113.

A new or expanded transfer protocol may preferably be used for the transfer of information between the mobile telecommunication terminal 200 and the Web server 250, and have an expanded field for enabling the terminal 200 to request the Web server 250 to execute a remote storage function.

The expanded field may include a flag bit (hereinafter, 'RS') indicative of the execution of the remote storage function. For example, when the mobile telecommunication terminal 200 sets the flag bit to 1, or RS=1, the Web server 250 runs a remote storage server program capable of additionally performing the remote storage function.

When the mobile telecommunication terminal 200 requests the Web server 250 for a remote storage service, it sends to the Web server 250 a URL indicative of the location of a Web text in the Web server 250 to be stored and a URL of the remote-site server 270 in which the Web text is to be stored, together with other additional information at step S114.

In response to the remote storage service request from the mobile telecommunication terminal 200, the Web server 250 checks the flag bit in the expanded field and runs the remote storage server program at step S115 if the flag bit has been set to 1. As a result, the Web server 250 checks the status of the remote-site server 270 desired by the mobile telecommunication terminal 200 at step S116 to determine whether it is online to the remote-site server 270. If the Web server 250 is online to the remote-site server 270, then it sets up a storage path with the server 270 at step S117.

A new or expanded transfer protocol may preferably be used for the transfer of information between the Web server 250 and the remote-site server 270 and have an expanded field for enabling the Web server 250 to request the remote-site server 270 to execute a remote storage function.

The expanded field may include a flag bit (hereinafter, 'RSF') indicative of the execution of the remote storage function. For example, when the Web server 250 sets the flag bit to 1, or RSF=1, the remote-site server 270 runs a remote storage server program capable of additionally performing the remote storage function.

After setting up the storage path with the remote-site server 270, the Web server 250 sets the flag bit in the expanded field to 1, or RSF=1, and sends to the remote-site server 270 a remote storage request message containing a URL indicative of a storage location of the Web text in the server 270, an IP address of the server 250, the contents of the Web text to be stored and other additional information, at steps S118 and S119, respectively.

Upon receiving the remote storage request message from the Web server 250, the remote-site server 270 checks the flag bit in the expanded field of the received request message and runs the remote storage server program at step S120 if the flag bit has been set to 1, or RSF=1. As a result, the remote-site server 270 checks the status of the storage path designated by the Web server 250 at step S121 to determine whether it is valid. In the case where the designated storage path is valid, the remote-site server 270 stores the contents of the Web text received from the Web server 250 in a specific location of its storage unit at step S122.

Thereafter, in order to notify the working state, the remote-site server 270 sends to the Web server 250 a remote storage response message including an expanded flag bit set to 1, or RSR=1, at step S123.

Upon receiving the remote storage response message including the expanded flag bit set to 1, or RSR=1, from the remote-site server 270, the Web server 250 checks the flag bit and then sends a remote storage response delivery message containing information received from the remote-site server 270 to the mobile telecommunication terminal 200 that has requested the remote storage service, at step S124.

At this time, the remote storage response delivery message sent to the mobile telecommunication terminal 200 includes an expanded flag bit set to 1, or RSRF=1.

Upon receiving the remote storage response delivery message from the Web server 250, including the expanded flag bit set to 1, or RSRF=1, the service requesting terminal 200 determines whether the associated remote storage work has been completed. If the associated remote storage work has been completed, the mobile telecommunication terminal 200 informs the information searcher by changing the indication of the intelligent icon from remote storage progress state to remote storage completion state at step S125.

On the other hand, in the case where it is determined that the Web server 250 is not online to the remote-site server 270, the Web server 250 sends an error message to the mobile telecommunication terminal 200 (at steps S126 and S127).

Then, the mobile telecommunication terminal 200 controls the intelligent icon at step S128 to indicate an error state and the Web server 250 sends a confirmation message to the mobile telecommunication terminal 200 at step S129 to confirm at step S130 whether the information searcher wants to deliver the Web text to the remote-site server 270 by E-mail. Unless the information searcher wants to deliver the Web text by E-mail, the Web server 250 ends the entire operation. However, if the information searcher wants to deliver the Web text by E-mail, then the Web server 250 requests the mail server 260 for an E-mail service at step S131.

Thereafter, the mail server 260 delivers the Web text to the remote-site server 270 by E-mail at step S132 and the entire operation ends.

On the other hand, in the case where it is determined that the storage path designated by the Web server 250 is not valid, the remote-site server 270 sends an error message to the Web server 250 at step S126.

Upon receiving the error message from the remote-site server 270, the Web server 250 sends it further to the mobile telecommunication terminal 200 at step S127.

In response to the error message from the Web server 250, the mobile telecommunication terminal 200 controls the intelligent icon at step S128 to indicate an error state, and the Web server 250 sends a confirmation message to the terminal 200 at step S129 to confirm at step S130 whether the information searcher wants to deliver the Web text to the remote-site server 270 by E-mail. Unless the information searcher wants to deliver the Web text by E-mail, the Web server 250 ends the entire operation. In the case where the information searcher wants to deliver the Web text by E-mail, the Web server 250 requests the mail server 260 for an E-mail service at step S131.

Subsequently, the mail server 260 delivers the Web text to the remote-site server 270 by E-mail at step S132 and the entire operation ends.

On the other hand, the Web server 250 may show the storage situation of the searched information in a local or remote backup space using a graph or icon. The Web server 250 may also show a storage tree indicative of a storage structure and connection state of a target computer in which the searched information is to be stored.

Although said another embodiment of the present invention describes only the case of storing searched information, the present invention may also be implemented to print the searched information as well as to store it, or to print it alone.

Further, although the above embodiment of the present invention describes the remote storage method using a mobile telecommunication terminal, it may be implemented in the same manner using PDA products having an insufficient memory capacity as well.

Also, in the above embodiments of the present invention, a desired Web text from a Web server is stored in neither a client nor a mobile telecommunication terminal, but directly in a remote-site server. At this time, because only abstracted contents of the Web text are displayed on the mobile telecommunication terminal, an information searcher may have difficulty in recognizing those contents and obtaining sufficient information therefrom. In this regard, not abstracted but rather the full contents of the Web text, may be stored in the remote-site server distinct from those displayed on the mobile telecommunication terminal. As an alternative, either the client or mobile telecommunication terminal may comprise a caching memory (RAM or disc) in which the desired Web text from the Web server is first stored and then in the remote-site server.

In other words, the information searcher accesses the Web server and searches it for desired information. The information searcher receives the searched information from the Web server and stores it in the client or mobile telecommunication terminal. Then, the information searcher sets up a transfer path between the client or mobile telecommunication terminal and the remote-site server, and stores the searched information in the remote-site server through the set-up transfer path.

Alternatively, the information searcher may access the Web server, search it for desired information, receive the searched information from the Web server, store it in the client or mobile telecommunication terminal, and send the searched information to the remote-site server by E-mail.

In an embodiment of the present invention, the following search engine is proposed to be constructed for search and storage of information using a mobile telecommunication terminal:

A general mobile telecommunication terminal may have difficulty in displaying a large amount of data because it is limited in buffer space for display. In order to overcome this difficulty, in a proposed service for the mobile telecommunication terminal, a new constituting element, or "Web abstract", is added to the original Web text and provided to a Web database and a Web search engine, in contrast to a conventional general service.

Accordingly, in case an information searcher accesses a desired Web text on the Internet using a mobile telecommunication terminal, an associated Web server provides primarily only a Web keyword or Web abstract element to the terminal.

Thereafter, in case the information searcher requests storage of the Web text, the Web server stores all the contents of or the constituting elements of the Web text such as the Web keyword, the Web abstract, the contents of the Web text, etc. in a remote-site server.

FIG. 5 is a drawing showing an Internet network to which the method for remote loading of information to the Internet in accordance with another embodiment of the present invention applies and FIGS. 6a and 6b are flowcharts illustrating the remote loading method in accordance with said another embodiment of the present invention.

First, an information user accesses a desired one of service servers 310a–310n on the Internet 330 such as Web servers using a client 299 at step S60 and searches the accessed service server (hereinafter, "310") for an uploading location for shared information using a Web browser or search engine at step S61.

The used Web browser or search engine may preferably be a new or expanded client program that provides the information user with a remote loading menu or icon and, when a remote loading service is in progress, with an intelligent icon indicative of the progress state.

If the information user has found the uploading location for the shared information, then he selects that location at step S62 and clicks on the remote loading menu or icon to request the accessed service server 310 for a remote loading service at step S63.

A new or expanded transfer protocol may preferably be used for the transfer of information between the client 299 and the service server 310, and have an expanded field for enabling the client 299 to request the service server 310 to execute a remote loading function.

The expanded field may include a flag bit (hereinafter, 'RL') indicative of the execution of the remote loading function. For example, when the client 299 sets the flag bit to 1, or RL=1, the service server 310 runs a remote loading server program capable of additionally performing the remote loading function.

When the client 299 requests a remote loading service of the accessed service server 310, it sends to the service server 310 URLs of a plurality of remote-site servers for remote loading 300a–300n and a URL indicative of an uploading location for a shared information text in the service server 310 together with other additional information at step S64.

Upon receiving the remote loading service request from the client 299, the accessed service server 310 checks the flag bit in the expanded field and runs the remote loading server program at step S65 if the flag bit has been set to 1. As a result, the service server 310 checks the status of any one of the remote loading servers 300a–300n selected by the client 299 at step S66 to determine whether it is online to the selected remote loading server (hereinafter, "300"). If the service server 310 is online to the remote loading server 300, then it sets up an uploading path with the server 300 at step S67.

Preferably, a new or expanded transfer protocol may be used for transfer of information between the service server 310 and the remote loading server 300 and have an expanded field for enabling the service server 310 to request the remote loading server 300 to execute a remote loading function.

The expanded field may include a flag bit (hereinafter, 'RLF') indicative of the execution of the remote loading function. For example, when the service server 310 sets the flag bit to 1, or RLF=1, the remote loading server 300 runs a remote loading server program capable of additionally performing the remote loading function.

After setting up the uploading path with the remote loading server 300, the service server 310 sets the flag bit in the expanded field to 1, or RLF=1, and sends to the remote loading server 300 a remote loading request message containing a URL indicative of a storage location for the shared information text in the server 300, an IP address of the server 310 and other additional information, at steps S68 and S69.

Upon receiving the remote loading request message from the service server 310, the remote loading server 300 checks the flag bit in the expanded field of the received request message and runs the remote loading server program at step S70 if the flag bit has been set to 1, or RLF=1. As a result, the remote loading server 300 checks the status of the uploading path designated by the service server 310 at step S71 to determine whether it is valid. In case the designated uploading path is valid, the remote loading server 300 uploads the contents of the shared information text from a specific location of its storage unit to the URL indicative of the uploading location in the service server 310 at step S72.

Thereafter, in order to notify the working state, the remote loading server 300 sends to the service server 310 a remote loading response message including an expanded flag bit set to 1, or RLR=1, at step S73.

Upon receiving the remote loading response message including the expanded flag bit set to 1, or RLR=1, from the remote loading server 300, the service server 310 checks the flag bit and then sends a remote loading response delivery message containing information received from the remote loading server 300 to the client 299 that has requested the remote loading service, at step S74.

At this time, the remote loading response delivery message sent to the client 299 includes an expanded flag bit set to 1, or RLRF=1.

Upon receiving the remote loading response delivery message including the expanded flag bit set to 1, or RLRF=1, from the service server 310, the service requesting client 299 determines whether the associated remote loading work has been completed. If the associated remote loading work has been completed, the client 299 informs the information user by changing the indication of the intelligent icon from remote loading progress state to remote loading completion state at step S75.

On the other hand, in the case where it is determined that the service server 310 is not online to the remote loading server 300, the service server 310 sends an error message to the client 299.

Then, the client 299 controls the intelligent icon at step S78 to indicate an error state and the service server 310 sends a confirmation message to the client 299 at step S79 to confirm at step S80 whether the information user wants to deliver the remote loading request message to the remote loading server 300 by E-mail. Unless the information user wants to deliver the remote loading request message by E-mail, the service server 310 ends the entire operation. However, if the information user wants to deliver the remote loading request message by E-mail, then the service server 310 requests a mail server 320 for an E-mail service at step S81.

Subsequently, the mail server 320 delivers the remote loading request message to the remote loading server 300 by E-mail at step S82 and the entire operation ends.

On the other hand, in the case where it is determined that the uploading path designated by the service server 310 is not valid, the remote loading server 300 sends an error message to the service server 310 at step S76.

Upon receiving the error message from the remote loading server 300, the service server 310 sends it further to the client 299 at step S77.

In response to the error message from the service server 310, the client 299 controls the intelligent icon at step S78 to indicate an error state, and the service server 310 sends a confirmation message to the client 299 at step S79 to confirm at step S80 whether the information user wants to deliver the remote loading request message to the remote loading server 300 by E-mail. Unless the information user wants to deliver the remote loading request message by E-mail, the service server 310 ends the entire operation. In the case where the information user wants to deliver the remote loading request message by E-mail, the service server 310 requests the mail server 320 for an E-mail service at step S81.

Thereafter, the mail server 320 delivers the remote loading request message to the remote loading server 300 by E-mail at step S82 and the entire operation ends.

On the other hand, the service server 310 may show an uploading situation for a shared information text from a local or remote backup space using a graph or icon. The service server 310 may also show a storage tree indicative of storage structures and connection states of target computers for the remote loading of the shared information text.

Although the above embodiment of the present invention describes only the case of remote loading operation, the present invention may also selectively perform a multiple loading operation.

FIG. 7 is a diagram showing a wireless Internet network to which the method for remote loading of information on the Internet in accordance with another embodiment of the present invention applies and FIGS. 8a and 8b are flowcharts illustrating the remote loading method in accordance with said another embodiment of the present invention.

Said wireless Internet network comprises: a mobile telecommunication terminal 400, equipped with an external command input unit for inputting external command, said terminal 400 converts the inputted command into a RF signal suitable to a data service and transmits the converted RF signal; a base transceiver station 410 which receives the RF signal transmitted from the mobile telecommunication terminal 400 and demodulates it into the original command; a wireless network 420 which functions to output the command demodulated by the base transceiver station 410 together with an ID number of the mobile telecommunication terminal 400 according to a protocol for an Internet service; a gateway 430 which receives an output signal from the wireless network 420 and converts the received signal into a TCP/IP signal or HTTP signal suitable to Internet connection; the Internet 440 which connects the gateway 430 to other networks for execution of operation associated with the command from the gateway 430; a service server 450, which may preferably be a Web server and provide information in response to the command from the Internet 440; a mail server 460; and a plurality of remote loading servers 470a–470n.

First, an information user accesses the service server 450 on the Internet 440 using the mobile telecommunication terminal 400 at step S210 and searches the accessed service server 450 for an uploading location for shared information using a Web browser or search engine at step S211.

The used Web browser or search engine may preferably be a new or expanded client program that provides the information user with a remote loading menu or icon and, when a remote loading service is in progress, with an intelligent icon indicative of the progress state.

If the information user has found the uploading location for the shared information, then he selects that location at step S212 and clicks on the remote loading menu or icon to request the service server 450 for a remote loading service at step S213.

A new or expanded transfer protocol may preferably be used for the transfer of information between the mobile telecommunication terminal 400 and the service server 450, and have an expanded field for enabling the terminal 400 to request the service server 450 to execute a remote loading function.

The expanded field may include a flag bit (hereinafter, 'RL') indicative of the execution of the remote loading function. For example, when the mobile telecommunication terminal 400 sets the flag bit to 1, or RL=1, the service server 450 runs a remote loading server program capable of additionally performing the remote loading function.

When the mobile telecommunication terminal 400 requests a remote loading service of the service server 450, it sends to the service server 450 URLs of the remote loading servers 470a–470n and a URL indicative of an uploading location for shared information text in the service server 450 together with other additional information at step S214.

In response to the remote loading service request from the mobile telecommunication terminal 400, the service server 450 checks the flag bit in the expanded field and runs the remote loading server program at step S215 if the flag bit has been set to 1. As a result, the service server 450 checks the status of any one of the remote loading servers 470a–470n selected by the mobile telecommunication terminal 400 at step S216 to determine whether it is online to the selected remote loading server (hereinafter, "470"). If the service server 450 is online to the remote loading server 470, then it sets up an uploading path with the server 470 at step S217.

A new or expanded transfer protocol may preferably be used for the transfer of information between the service server 450 and the remote loading server 470 and have an expanded field for enabling the service server 450 to request the remote loading server 470 to execute a remote loading function.

The expanded field may include a flag bit (hereinafter, 'RLF') indicative of the execution of the remote loading function. For example, when the service server 450 sets the flag bit to 1, or RLF=1, the remote loading server 470 runs a remote loading server program capable of additionally performing the remote loading function.

After setting up the uploading path with the remote loading server 470, the service server 450 sets the flag bit in the expanded field to 1, or RLF=1, and sends to the remote loading server 470 a remote loading request message containing a URL indicative of a storage location of the shared information text in the server 470, an IP address of the server 450 and other additional information, at steps S218 and S219, respectively.

Upon receiving the remote loading request message from the service server 450, the remote loading server 470 checks the flag bit in the expanded field of the received request message and runs the remote loading server program at step S220 if the flag bit has been set to 1, or RLF=1. As a result, the remote loading server 470 checks the status of the uploading path designated by the service server 450 at step S221 to determine whether it is valid. In the case where the designated uploading path is valid, the remote loading server 470 uploads the contents of the shared information text from a specific location of its storage unit to the URL indicative of the uploading location in the service server 450 at step S222.

Subsequently, in order to notify the working state to the service server 450, the remote loading server 470 sends to the service server 450 a remote loading response message including an expanded flag bit set to 1, or RLR=1, at step S223.

Upon receiving the remote loading response message including the expanded flag bit set to 1, or RLR=1, from the remote loading server 470, the service server 450 checks the flag bit and then sends a remote loading response delivery message containing information received from the remote loading server 470 to the mobile telecommunication terminal 400 that has requested the remote loading service, at step S224.

At this time, the remote loading response delivery message sent to the mobile telecommunication terminal 400 includes an expanded flag bit set to 1, or RLRF=1.

Upon receiving the remote loading response delivery message from the service server 450, including the expanded flag bit set to 1, or RLRF=1, the service requesting terminal 400 determines whether the associated remote loading work has been completed. If the associated remote loading work has been completed, the mobile telecommunication terminal 400 informs the information user by changing the indication of the intelligent icon from remote loading progress state to remote loading completion state at step S225.

On the other hand, in the case where it is determined that the service server 450 is not online to the remote loading server 470, the service server 450 sends an error message to the mobile telecommunication terminal 400.

Then, the mobile telecommunication terminal 400 controls the intelligent icon at step S228 to indicate an error state and the service server 450 sends a confirmation message to the terminal 400 at step S229 to confirm at step S230 whether the information user wants to deliver the remote loading request message to the remote loading server 470 by E-mail. Unless the information user wants to deliver the remote loading request message by E-mail, the service server 450 ends the entire operation. However, if the information user wants to deliver the remote loading request message by E-mail, then the service server 450 requests the mail server 460 for an E-mail service at step S231.

Thereafter, the mail server 460 delivers the remote loading request message to the remote loading server 470 by E-mail at step S232 and the entire operation ends.

On the other hand, in the case where it is determined that the uploading path designated by the service server 450 is not valid, the remote loading server 470 sends an error message to the service server 450 at step S226.

Upon receiving the error message from the remote loading server 470, the service server 450 sends it further to the mobile telecommunication terminal 400 at step S227.

In response to the error message from the service server 450, the mobile telecommunication terminal 400 controls the intelligent icon at step S228 to indicate an error state, and the service server 450 sends a confirmation message to the terminal 400 at step S229 to confirm at step S230 whether the information user wants to deliver the remote loading request message to the remote loading server 470 by E-mail. Unless the information user wants to deliver the remote loading request message by E-mail, the service server 450 ends the entire operation. In the case where the information user wants to deliver the remote loading request message by E-mail, the service server 450 requests the service server 460 for an E-mail service at step S231.

Subsequently, the mail server 460 delivers the remote loading request message to the remote loading server 470 by E-mail at step S232 and the entire operation ends.

On the other hand, the service server 450 may show a remote loading situation of the shared information text from a local or remote backup space using a graph or icon. The service server 450 may also show a storage tree indicative of storage structures and connection states of target computers for the remote loading of the shared information text.

Although said another embodiment of the present invention describes only the case of remote loading operation, the present invention may also selectively perform a multiple loading operation.

Further, although the above embodiment of the present invention describes the remote loading method using a mobile telecommunication terminal, it may be implemented in the same manner using PDA products having insufficient memory capacity as well.

Also, in the above embodiments of the present invention, a shared information text from a plurality of remote loading servers is stored in neither a client nor a mobile telecommunication terminal, but directly uploaded to a service server. As an alternative, either the client or mobile telecommunication terminal may comprise a caching memory (RAM or disc) in which the shared information text from the remote loading servers is first stored and then uploaded to the service server.

In other words, an information user accesses the service server and searches it for an uploading location for shared information. The information user receives information about the uploading location from the service server and stores it in the client or mobile telecommunication terminal. Then, the information user sets up a transfer path between the client or mobile telecommunication terminal and a selected one of the remote loading servers and sends the uploading location information to the selected remote loading server, thereby allowing the selected loading server to upload the shared information to the uploading location in the service server.

Alternatively, the information user may access the service server, search it for an uploading location for shared information, receive information about the uploading location from the service server, store it in the client or mobile telecommunication terminal, set up a transfer path between the client or mobile telecommunication terminal and a selected one of the remote loading servers, and send the uploading location information to the selected remote loading server so that the selected loading server can upload the shared information to the uploading location in the service server by E-mail.

Alternatively, the information user may access the service server, search it for an uploading location for shared information, receive information about the uploading location from the service server, store it in the client or mobile telecommunication terminal, set up a transfer path between the client or mobile telecommunication terminal and a selected one of the remote loading servers, receive the shared information from the selected remote loading server, and upload the received information to the uploading location in the service server.

Alternatively, the information user may access the service server, search it for an uploading location for shared information, receive information about the uploading location from the service server, store it in the client or mobile telecommunication terminal, set up a transfer path between the client or mobile telecommunication terminal and a selected one of the remote loading servers, receive the shared information from the selected remote loading server, and upload the received information to the uploading location in the service server by E-mail.

In another embodiment of the present invention, a search engine having the following construction is proposed for remote loading of shared information using a mobile telecommunication terminal:

A general mobile telecommunication terminal may have difficulty in displaying a large amount of data because it has limited buffer space for display. In order to overcome this difficulty, the database or search engine of the new mobile telecommunication service comprises a new constituting element, "text abstract (e.g., Web abstract)", in addition to the original information text.

Consequently, in case the user needs to remotely load an information text, all the contents of the information text are remotely loaded from remote loading servers according to said embodiment of the present invention.

FIG. 9 is a drawing showing an Internet network to which the method for duplicate storing of information searched and accessed on the Internet in accordance with another embodiment of the present invention applies and FIGS. 10a and 10b are flowcharts illustrating the duplicate storage method in accordance with said embodiment of the present invention.

First, an information searcher accesses a desired one of service servers 510a–510n on the Internet 530 such as Web servers, using a client 499 at step S300 and searches the accessed service server (hereinafter, "510") for desired information using a Web browser or search engine at step S301.

The used Web browser or search engine may preferably be a new or expanded client program that provides the information searcher with a duplicate storage menu or icon and, when a duplicate storage service is in progress, with an intelligent icon indicative of the progress state.

If the information searcher has found the desired information, he selects the information to be stored from the searched information at step S302 and clicks on the duplicate storage menu or icon to request the accessed service server 510 for a duplicate storage service at step S303.

Preferably, a new or expanded transfer protocol may be used for transfer of information between the client 499 and the service server 510 and have an expanded field for enabling the client 499 to request the service server 510 to execute a duplicate storage function.

The expanded field may include a flag bit (hereinafter, "DS") indicative of the execution of the duplicate storage function. For example, when the client 499 sets the flag bit to 1, or DS=1, the service server 510 runs a duplicate storage server program capable of additionally performing the duplicate storage function.

When the client 499 requests the accessed service server 510 for a duplicate storage service, it sends to the service server 510 URLs of the remote site servers 500a–500n for duplicate storage and a URL indicative of the location of the information text to be stored in the service server 510, together with other additional information at step S304.

Upon receiving the duplicate storage service request from the client 499, the accessed service server 510 checks the flag bit in the expanded field and runs the duplicate storage server program at step S305 if the flag bit has been set to 1. As a result, the service server 510 checks the status of each of the duplicate storage servers 500a–500n desired by the client 499 at step S306 to determine whether it is online to the respective duplicate storage servers 500a–500n. If the service server 510 is online to the respective duplicate storage servers 500a–500n, then it sets up a storage path with each of the servers 500a–500n at step S307.

Preferably, a new or expanded transfer protocol may be used for transfer of information between the service server 510 and each of the duplicate storage servers 500a–500n and have an expanded field for enabling the service server 510 to request each of the duplicate storage servers 500a–500n to execute a duplicate storage function.

The expanded field may include a flag bit (hereinafter, "DSF") indicative of the execution of the duplicate storage function. For example, when the service server 510 sets the flag bit to 1, or DSF=1, each of the duplicate storage servers 500a–500n runs a duplicate storage server program capable of additionally performing the duplicate storage function.

After setting up the storage paths with the duplicate storage servers 500a–500n, the service server 510 sets the flag bit in the expanded field to 1, or DSF=1, and sends to each of the duplicate storage servers 500a–500n a duplicate storage request message containing a URL indicative of a storage location of the information text in each of the servers 500a–500n, an IP address of the server 510, the contents of the information text to be stored and other additional information, at steps S308 and S309.

Upon receiving the duplicate storage request message from the service server 510, each of the duplicate storage servers 500a–500n checks the flag bit in the expanded field of the received request message and runs the duplicate storage server program at step S310 if the flag bit has been set to 1, or DSF=1. As a result, each of the duplicate storage servers 500a–500n checks the status of an associated one of the storage paths designated by the service server 510 at step S311 to determine whether it is valid. In case the associated storage path is valid, each of the duplicate storage servers 500a–500n stores the contents of the information text received from the service server 510 in a specific location of its storage unit at step S312.

Thereafter, in order to notify the working state, each of the duplicate storage servers 500a–500n sends to the service server 510 a duplicate storage response message including an expanded flag bit set to 1, or DSR=1, at step S313.

Upon receiving the duplicate storage response message including the expanded flag bit set to 1, or DSR=1, from each of the duplicate storage servers 500a–500n, the service server 510 checks the flag bit and then sends a duplicate storage response delivery message containing information received from each of the duplicate storage servers 500a–500n to the client 499 that has requested the duplicate storage service, at step S314.

At this time, the duplicate storage response delivery message sent to the client 499 includes an expanded flag bit set to 1, or DSRF=1.

Upon receiving the duplicate storage response delivery message including the expanded flag bit set to 1, or DSRF=1, from the service server 510, the service requesting client 499 determines whether the associated duplicate storage work has been completed. If the associated duplicate storage work has been completed, the client 499 informs the information searcher by changing the indication of the intelligent icon from duplicate storage progress state to duplicate storage completion state at step S315.

On the other hand, in the case where it is determined that the service server 510 is not online to any one of the duplicate storage servers 500a–500n, the service server 510 sends an error message to the client 499.

In response to the error message from the service server 510, the client 499 controls the intelligent icon at step S318 to indicate an error state, and the service server 510 sends a confirmation message to the client 499 at step S319 to confirm at step S320 whether the information searcher wants to deliver the information text to the not-online duplicate storage server by E-mail. Unless the information searcher wants to deliver the information text by E-mail, the service server 510 ends the entire operation. However, if the information searcher wants to deliver the information text by E-mail, the service server 510 requests the mail server 520 for an E-mail service at step S321.

Subsequently, the mail server 520 delivers the information text to the not-online duplicate storage server by E-mail at step S322 and the entire operation ends.

On the other hand, in the case where it is determined that any one of the storage paths designated by the service server 510 is not valid, the associated one of the duplicate storage servers 500a–500n sends an error message to the service server 510 at step S316.

Upon receiving the error message from the associated duplicate storage server, the service server 510 sends it further to the client 499 at step S317.

In response to the error message from the service server 510, the client 499 controls the intelligent icon at step S318 to indicate an error state, and the service server 510 sends a confirmation message to the client 499 at step S319 to confirm at step S320 whether the information searcher wants to deliver the information text to the associated duplicate storage server by E-mail. Unless the information searcher wants to deliver the information text by E-mail, the service server 510 ends the entire operation. In the case where the information searcher wants to deliver the information text by E-mail, the service server 510 requests the mail server 520 for an E-mail service at step S321.

Thereafter, the mail server 520 delivers the information text to the associated duplicate storage server by E-mail at step S322 and the entire operation ends.

On the other hand, the service server 510 may show a storage situation of searched information in a local or remote backup space using a graph or icon. The service server 510 may further show a storage tree indicative of storage structures and connection states of target computers in which the searched information is to be stored duplicate.

Although said another embodiment of the present invention describes only the case of duplicate storing of the searched information, the present invention may also be implemented to duplicate printing as well as storing of the searched information, or to duplicate printings of the searched information only.

FIG. 11 is a diagram showing a wireless Internet network to which the method for duplicate storing of the information searched and accessed on the Internet in accordance with another embodiment of the present invention applies and FIGS. 12a and 12b are flowcharts illustrating the duplicate storage method in accordance with said embodiment of the present invention.

Said wireless Internet network comprises: a mobile telecommunication terminal 600, equipped with an external command input unit for inputting external command, said terminal 600 converts the inputted command into a RF signal suitable to a data service and transmits the converted RF signal; a base transceiver station 610 which receives the RF signal transmitted from the mobile telecommunication terminal 600 and demodulates it into the original command; a wireless network 620 which functions to output the command demodulated by the base transceiver station 610 together with an ID number of the mobile telecommunication terminal 600 according to a protocol for an Internet service; a gateway 630 which acts to receive an output signal from the wireless network 620 and converts the received signal into a TCP/IP signal or HTTP signal suitable to Internet connection; the Internet 640 which connects the gateway 630 to other networks for execution of an operation associated with a command from the gateway 630; a service server 650, which may preferably be a Web server and provide information in response to the command from the Internet 640; a mail server 660 and a plurality of duplicate storage servers 670a–670n.

First, an information searcher accesses the service server 650 on the Internet 640 using the mobile telecommunication terminal 600 at step S410 and searches the accessed service server 650 for desired information using a Web browser or search engine at step S411.

The used Web browser or search engine may preferably be a new or expanded client program that provides the information searcher with a duplicate storage menu or icon and, when a duplicate storage service is in progress, with an intelligent icon indicative of the progress state.

If the information searcher has found the desired information, he selects the information to be stored in a duplicate manner from the searched information at step S412 and clicks on the duplicate storage menu or icon to request the service server 650 for a duplicate storage service at step S413.

A new or expanded transfer protocol may preferably be used for the transfer of information between the mobile telecommunication terminal 600 and the service server 650 and have an expanded field for enabling the terminal 600 to request the service server 650 to execute a duplicate storage function.

The expanded field may include a flag bit (hereinafter, "DS") indicative of the execution of the duplicate storage function. For example, when the mobile telecommunication terminal 600 sets the flag bit to 1, or DS=1, the service server 650 runs a duplicate storage server program capable of additionally performing the duplicate storage function.

When the mobile telecommunication terminal 600 requests a duplicate storage service of the service server 650, it sends to the service server 650 URLs of the duplicate storage servers 670a–670n and a URL indicative of the location of an information text to be stored in the service server 650, together with other additional information at step S414.

Upon receiving the duplicate storage service request from the mobile telecommunication terminal 600, the service server 650 checks the flag bit in the expanded field and runs the duplicate storage server program at step S415 if the flag bit has been set to 1. As a result, the service server 650 checks the status of each of the duplicate storage servers 670a–670n desired by the mobile telecommunication terminal 600 at step S416 to determine whether it is online to the respective duplicate storage servers 670a–670n. If the service server 650 is online to the respective duplicate storage servers 670a–670n, then it sets up a storage path with each of the servers 670a–670n at step S417.

A new or expanded transfer protocol may preferably be used for the transfer of information between the service server 650 and each of the duplicate storage servers 670a–670n and have an expanded field for enabling the service server 650 to request each of the duplicate storage servers 670a–670n to execute a duplicate storage function.

The expanded field may include a flag bit (hereinafter, "DSF") indicative of the execution of the duplicate storage function. For example, when the service server 650 sets the flag bit to 1, or DSF=1, each of the duplicate storage servers 670a–670n runs a duplicate storage server program capable of additionally performing the duplicate storage function.

After setting up the storage paths with the duplicate storage servers 670a–670n, the service server 650 sets the flag bit in the expanded field to 1, or DSF=1, and sends to each of the duplicate storage servers 670a–670n a duplicate storage request message containing a URL indicative of a storage location of the information text in each of the servers 670a–670n, an IP address of the server 650, the contents of the information text to be stored and other additional information, at steps S418 and S419, respectively.

Upon receiving the duplicate storage request message from the service server 650, each of the duplicate storage servers 670a–670n checks the flag bit in the expanded field of the received request message and runs the duplicate storage server program at step S420 if the flag bit has been set to 1, or DSF=1. As a result, each of the duplicate storage servers 670a–670n checks the status of the associated storage paths designated by the service server 650 at step S421 to determine whether it is valid. In the case where the associated storage path is valid, each of the duplicate storage servers 670a–670n stores the contents of the information text received from the service server 650 in a specific location of its storage unit at step S422.

Subsequently, in order to notify the working state to the service server 650, each of the duplicate storage servers 670a–670n sends to the service server 650 a duplicate storage response message including an expanded flag bit set to 1, or DSR=1, at step S423.

Upon receiving the duplicate storage response message including the expanded flag bit set to 1, or DSR=1, from each of the duplicate storage servers 670a–670n, the service server 650 checks the flag bit and then sends a duplicate storage response delivery message containing information received from each of the duplicate storage servers 670a–670n to the mobile telecommunication terminal 600 that has requested the duplicate storage service, at step S424.

At this time, the duplicate storage response delivery message sent to the mobile telecommunication terminal 600 includes an expanded flag bit set to 1, or DSRF=1.

Upon receiving the duplicate storage response delivery message from the service server 650, including the expanded flag bit set to 1, or DSRF=1, the service requesting terminal 600 determines whether the associated duplicate storage work has been completed. If the associated duplicate storage work has been completed, the mobile telecommunication terminal 600 informs the information searcher by changing the indication of the intelligent icon from duplicate storage progress state to duplicate storage completion state at step S425.

On the other hand, in the case where it is determined that the service server 650 is not online to any one of the duplicate storage servers 670a–670n, the service server 650 sends an error message to the mobile telecommunication terminal 600.

Then, the mobile telecommunication terminal 600 controls the intelligent icon at step S428 to indicate an error state and the service server 650 sends a confirmation message to the terminal 600 at step S429 to confirm at step S430 whether the information searcher wants to deliver the information text to the not-online duplicate storage server by E-mail. Unless the information searcher wants to deliver the information text by E-mail, the service server 650 ends the entire operation. However, if the information searcher wants to deliver the information text by E-mail, then the service server 650 requests the mail server 660 for an E-mail service at step S431.

Thereafter, the mail server 660 delivers the information text to the not-online duplicate storage server by E-mail at step S432 and the entire operation ends.

On the other hand, in the case where it is determined that any one of the storage paths designated by the service server 650 is not valid, an associated one of the duplicate storage servers 670a–670n sends an error message to the service server 650 at step S426.

Upon receiving the error message from the associated duplicate storage server, the service server 650 sends it further to the mobile telecommunication terminal 600 at step S427.

In response to the error message from the service server 650, the mobile telecommunication terminal 600 controls the intelligent icon at step S428 to indicate an error state, and the service server 650 sends a confirmation message to the terminal 600 at step S429 to confirm at step S430 whether the information searcher wants to deliver the information text to the associated duplicate storage server by E-mail. Unless the information searcher wants to deliver the information text by E-mail, the service server 650 ends the entire operation. In the case where the information searcher wants to deliver the information text by E-mail, the service server 650 requests the mail server 660 for an E-mail service at step S431.

Subsequently, the mail server 660 delivers the information text to the associated duplicate storage server by E-mail at step S432 and the entire operation ends.

On the other hand, the service server 650 may show storage situation of the searched information in a local or remote backup space using a graph or icon. The service server 650 may also show a storage tree indicative of storage structures and connection states of target computers in which the searched information is to be duplicately stored.

Although said another embodiment of the present invention describes only the case of duplicate storing of the searched information, the present invention may also be implemented to duplicate printing as well as storing of the searched information, or to duplicate printings of the searched information only.

Further, although the above embodiment of the present invention describes the duplicate storage method using a mobile telecommunication terminal, the present invention can be implemented in the same manner using PDA products having an insufficient memory capacity as well.

Also, in the above embodiments of the present invention, a desired information text from a service server is stored in neither a client nor a mobile telecommunication terminal, but directly stored in remote site duplicate storage servers in a duplicate manner. As an alternative, either the client or mobile telecommunication terminal may comprise a caching memory (RAM or disc) in which the desired information text from the service server may be first stored and then duplicate stored in remote-site duplicate storage clients.

In other words, an information searcher accesses the service server and searches it for desired information. The information searcher receives the searched information from the service server and stores it in the client or mobile telecommunication terminal. Then, the information searcher sets up transfer paths between the client or mobile telecommunication terminal and the remote site duplicate storage clients, respectively, and stores the searched information duplicate in the remote site clients along the set up transfer paths.

Alternatively, the information searcher may access the service server, search it for desired information, receive the searched information from the service server, store it in the client or mobile telecommunication terminal and send the searched information to the remote site duplicate storage clients by E-mail.

In the above embodiment of the present invention, the a search engine having the following construction is proposed for search and duplicate storage of information using a mobile telecommunication terminal:

A general mobile telecommunication terminal may have difficulty in displaying a large amount of data because it has limited buffer space for display. In order to overcome this difficulty, the database or search engine of the new mobile telecommunication service comprises a new constituting element, "text abstract (e.g., Web abstract)", in addition to the original information text, in contrast to a conventional information text.

Accordingly, in the case where an information searcher accesses a desired information text using his mobile telecommunication terminal, an associated service server provides primarily only an information keyword or information abstract element to the terminal.

Subsequently, in the case where the information searcher requests a duplicate storage of the information text, the service server stores primarily all the contents or constituting elements of the information text such as the information keyword, the information abstract, the contents of the information text, etc. into remote-site duplicate storage clients according to said embodiment of the present invention.

Although the above embodiments of the present invention have been described for illustrative purposes, those skilled in the art will appreciate that various modifications, additions and substitutions are possible, without departing from the scope and spirit of the invention as described in the accompanying claims. For example, the present invention is not restricted to Web servers and Web browsers.

INDUSTRIAL APPLICABILITY

As apparent from the above description, the present invention discloses an information search/storage system capable of providing a more convenient interface to information user than that of a conventional system as well as storing information desired by the user rapidly, safely and readily.

Further, according to the present invention, a software can easily be expanded through implementation of the software alone, requiring no variation in the existing communication environments.

Further, the present invention provides a base technique for the activation of a diversified and improved information search/storage technology by computer, thereby activating use of mobile terminals or portable terminals having insufficient resources.

Further, the present invention has the effect of maximizing mobility of an information searcher, avoiding unnecessary and duplicate search of information as much as possible and maximizing the utilization efficiency of mobile telecommunication terminals which have simple and fundamental constructions.

Further, the present invention has the effect of allowing information searchers to overcome restrictions in time and space in respect to their access to and storage of information, thereby maximizing the work efficiency of the information searchers and enhancing economic productivity of these searchers.

Further, the present invention discloses an information search/storage system which is capable of providing an interface more convenient than that of a conventional system to information user and capable of multiple loading information desired by the user from a plurality of distributed sites desired by the user, rapidly, safely and readily.

Further, the present invention provides a base technique for the activation of a diversified and improved information search/storage (including uploading) technology by computer, thereby activating use of mobile terminals or portable terminals having insufficient resources.

Further, the present invention has the effect of maximizing mobility of an information user, avoiding unnecessary and duplicate storage or uploading of information as much as possible and maximizing the utilization efficiency of mobile telecommunication terminals which have simple and fundamental constructions.

Further, the present invention has the effect of allowing information users to overcome restrictions in time and space in respect to their access to and uploading of information, thereby maximizing the work efficiency of the information users and enhancing the economic productivity of these users.

Further, the present invention allows an information user, in the case where an attempt to connect to a specific remote loading server fails or a connection thereto is interrupted due to a change in communication environments or to other defects, to gain uploading access to same information stored in other remote loading servers in a duplicate manner, and thereby enables said information user to overcome the restrictions in time and space and to have uploading access to said information, and thus leads to maximize the work efficiency of the information user and to enhance the economic productivity of the user.

Further, the present invention discloses an information search/storage system which is capable of providing an interface more convenient than that of a conventional system to information user and duplicate storing information desired by the user in a plurality of distributed sites desired by the user rapidly, safely, and readily.

Further, the present invention allows information searcher, in the case where an attempt to connect to a specific server fails or a connection thereto is interrupted due to a change in communication environments or due to other defects, to gain access to the same information stored in different servers, and thereby enables the information searcher to overcome restrictions in time and space and to have an access to said information, and thus leads to maximize the work efficiency of the information searcher and to enhance the economic productivity of the searcher.

What is claimed is:

1. A method for remote storing of information comprising the steps of:
   a) allowing an information searcher to access a Web server and search for desired information;
   b) allowing said information searcher to request said Web server for a remote storage service;
   c) allowing said information searcher to send to said Web server a uniform resource locator of the searched information and a uniform resource locator of a remote-site in which said searched information is to be stored;
   d) allowing said Web server to set up a storage path with said remote-site server under the condition that said Web server is online to said remote-site server and to send a remote storage request message to said remote-site server;
   e) allowing said Web server to send to said remote-site server a Web text to be stored and a uniform resource locator indicative of a storage location of the Web text in said remote-site server; and
   f) allowing said remote-site server to store said Web text if said storage path set-up by said Web server is valid.

2. A method for remote storing of information as set forth in claim 1, comprising an additional step g) of allowing said remote-site server to send a storage completion message to said information searcher via said Web server after storing said Web text.

3. A method for remote storing of information as set forth in claim 1, wherein said step a) includes the step of allowing said information searcher to access said Web server using a mobile telecommunication terminal.

4. A method for remote storing of information as set forth in claim 2, wherein said step a) includes the step of allowing said information searcher to access said Web server using a mobile telecommunication terminal.

5. A method for remote storing of information as set forth in claim 1, wherein said step a) includes the step of allowing said information searcher to access said Web server using a personal information terminal.

6. A method for remote storing of information as set forth in claim 2, wherein said step a) includes the step of allowing said information searcher to access said Web server using a personal information terminal.

7. A method for remote storing of information as set forth in claim 1, comprising further steps of:
   h) allowing said Web server to send an error message to said information searcher if said Web server is not online to said remote-site server after said step c) is performed;
   i) allowing said Web server to confirm whether said information searcher desires an electronic mail service; and
   j) allowing said Web server to send said Web text to said remote-site server by electronic mail via a mail server if said information desires said electronic mail service.

8. A method for remote storing of information as set forth in claim 1, comprising further steps of:
   h) allowing said remote-site server to send an error message to said information searcher via said Web server if said storage path set-up by said Web server is not valid after said step e) is performed;
   i) allowing said Web server to confirm whether said information searcher desires an electronic mail service; and
   j) allowing said Web server to send said Web text to said remote-site server by electronic mail via a mail server if said information searcher desires said electronic mail service.

9. A method for remote storing of information as set forth in claim 7, comprising further steps of:
   k) allowing said remote-site server to send an error message to said information searcher via said Web server if said storage path set-up by said Web server is not valid after said step e) is performed;
   l) allowing said Web server to confirm whether said information searcher desires said electronic mail service; and
   m) allowing said Web server to send said Web text to said remote-site server by electronic mail via said mail server if said information searcher desires said electronic mail service.

10. A method for remote storing of information comprising the steps of:
   a) allowing an information searcher to access a Web server and search for desired information;
   b) allowing said information searcher to request said Web server for a remote storage service;
   c) allowing said information searcher to send to said Web server a uniform resource locator of the searched information and uniform resource locators of a plurality of remote-site clients in which said searched information is to be stored;
   d) allowing said Web server to set up storage paths with said remote-site clients, respectively, under the condition that said Web server is online to said respective remote-site clients and send a remote storage request message to each of said remote-site clients;
   e) allowing said Web server to send to each of said remote-site clients a Web text to be stored and a uniform resource locator indicative of a storage location of the Web text in each of said remote-site clients; and
   f) allowing each of said remote-site clients to store said Web text if the corresponding storage path set-up by said Web server is valid.

11. A method for remote storing of information as set forth in claim 10, comprising a further step g) of allowing each of said remote-site clients to sent a storage completion message to said information searcher via said Web server after storing said Web text.

12. A method for remote storing of information as set forth in claim 10, wherein said step a) includes the step of allowing said information searcher to access said Web server using a mobile telecommunications terminal.

13. A method for remote storing of information as set forth in claim 11, wherein said step a) includes the step of allowing said information searcher to access said Web server using a mobile telecommunication terminal.

14. A method for remote storing of information as set forth in claim 10, wherein said step a) includes the step of allowing said information searcher to access said Web server using a personal information terminal.

15. A method for remote storing of information as set forth in claim 11, wherein said step a) includes the step of allowing said information searcher to access said Web server using a personal information terminal.

16. A method for remote storing of information as set forth in claim 10, comprising further steps of:
- h) allowing said Web server to send an error message to said information searcher if said Web server is not online to any one of said remote-site clients after said step c) is performed;
- i) allowing said Web server to confirm whether said information search desires an electronic mail service; and
- j) allowing said Web server to send said Web text to said not-online remote-site client by electronic mail via a mail server if said information searcher desires said electronic mail service.

17. A method for remote storing of information as set forth in claim 10, comprising further steps of:
- h) allowing any one of said remote-site clients to send an error message to said information searcher via said Web server if the associated storage path set-up by said Web server is not valid after said step e) is performed;
- i) allowing said Web server to confirm whether said information searcher desires an electronic mail service; and
- j) allowing said Web server to send said Web text to said remote-site client associated with said invalid storage path by electronic mail via a mail server if said information searcher desires said electronic mail service.

18. A method for remote storing of information as set forth in claim 16, comprising further steps of:
- k) allowing any one of said remote-site clients to send an error message to said information searcher via said Web server if the associated storage path set-up by said Web server is not valid after said step e) is performed;
- l) allowing said Web server to confirm whether said information searcher desires said electronic mail service; and
- m) allowing said Web server to send said Web text to said remote-site client associated with said invalid storage path by electronic mail via said mail server if said information searcher desires said electronic mail service.

* * * * *